US009873037B2

(12) United States Patent
Hamilton

(10) Patent No.: US 9,873,037 B2
(45) Date of Patent: Jan. 23, 2018

(54) INFORMATION DISPLAY MODULE AND FAIRING

(71) Applicant: Anthony Carl Hamilton, Hitchin (GB)

(72) Inventor: Anthony Carl Hamilton, Hitchin (GB)

( * ) Notice: Subject to any disclaimer, the term of this patent is extended or adjusted under 35 U.S.C. 154(b) by 221 days.

(21) Appl. No.: 14/720,348

(22) Filed: May 22, 2015

(65) Prior Publication Data

US 2016/0067597 A1 Mar. 10, 2016

(30) Foreign Application Priority Data

Sep. 10, 2014 (GB) .................................. 1416016.2
Nov. 17, 2014 (GB) .................................. 1420340.0
Feb. 26, 2015 (GB) .................................. 1503197.4

(51) Int. Cl.
*G07C 1/24* (2006.01)
*A63F 9/14* (2006.01)
*B60Q 1/26* (2006.01)
*B60Q 1/50* (2006.01)
*G09F 21/04* (2006.01)

(52) U.S. Cl.
CPC .............. *A63F 9/14* (2013.01); *B60Q 1/2661* (2013.01); *B60Q 1/503* (2013.01); *G09F 21/04* (2013.01)

(58) Field of Classification Search
CPC ......... A63F 9/14; B60Q 1/2661; B60Q 1/503; G09F 21/04; G06F 3/1423; G07C 1/24; G09G 2370/022; H04N 21/2353; H04N 21/478; H04N 21/8126; H04N 21/84
USPC .... 340/323, 425.5, 468, 466, 479, 936, 901, 340/905, 933, 941
See application file for complete search history.

(56) References Cited

U.S. PATENT DOCUMENTS 6,404,519 B1 * 6/2002 McAbee ................. G09F 21/04 359/22
6,411,205 B1 * 6/2002 Reid ........................ B60Q 1/50 307/10.1
8,199,975 B2 6/2012 Pomerleau et al.
2001/0029865 A1 * 10/2001 Clark, Jr. ............. A63H 17/262 104/60
2001/0045978 A1 * 11/2001 McConnell ............. A63F 13/00 348/42

(Continued)

FOREIGN PATENT DOCUMENTS

DE 10 2007 059735 A1 7/2008
DE 20 2013 103405 U1 11/2014

(Continued)

OTHER PUBLICATIONS

British Search Report dated Mar. 8, 2016 in corresponding Great Britain Application No. GB1503197.4.

(Continued)

*Primary Examiner* — Daniel Previl
(74) *Attorney, Agent, or Firm* — Knobbe, Martens, Olson & Bear, LLP

(57) ABSTRACT

An information display module for a motor-racing vehicle comprising: a housing attachable to the motor-racing vehicle; a display configured to display race-related information to spectators of said race, said information display module configured to use received information to determine the race-related information to be displayed, said race-related information comprising a relative position of said vehicle to one or more other vehicles in said race.

14 Claims, 37 Drawing Sheets

600
662 660 602
604
608
610
612

(56) References Cited

U.S. PATENT DOCUMENTS

| | | | | |
|---|---|---|---|---|
| 2004/0095228 | A1* | 5/2004 | Fugit | B60Q 1/50 340/425.5 |
| 2008/0173816 | A1 | 7/2008 | Everett et al. | |
| 2011/0267466 | A1 | 11/2011 | Brester | |
| 2014/0247349 | A1 | 9/2014 | Heard | |

FOREIGN PATENT DOCUMENTS

| | | | |
|---|---|---|---|
| EP | 2869676 | A1 | 5/2015 |
| FR | 2776439 | A1 | 9/1999 |
| FR | 2974310 | A1 | 10/2012 |

OTHER PUBLICATIONS

Extended European Search Report dated Feb. 2, 2016 in corresponding European Application No. 15184426.3.

* cited by examiner 524
540
541

550
552
554
524
526

550'
552'
554'
524
526'

1826
1829
1860

1826
1860

1927
1926
1936
1916
1951

2550
2552
2560
2590
2562
2534
2446
2536
2572
2592

INFORMATION DISPLAY MODULE AND FAIRING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present application relates to an information display module for displaying race information to spectators at motor racing events, and vehicles comprising such a display module. The present application also relates to a fairing, for example for a go-kart.

Description of the Related Technology

Motor racing, or motorsport, comprises many different formulas and events. For example, known motorsport events include Formula 1, Formula 2, Formula 3, Indycar, The World Rally Championship, NASCAR, Deutsche Tourenwagen Masters (DTM), go-kart racing, motorcycle racing, to name just a few. Some of these events, for example Formula 1, comprise a qualifying session during which competitors race against the clock to try and post the fastest time for a single lap. The competitor with the fastest qualifying time then takes pole position on the grid for a multi-lap race (Grand Prix); the second fastest person takes second place on the grid and so on. In other events, such as the World Rally Championship, the competitors race against the clock over various stages, with the winner being the competitor who posts the fastest overall time.

At motorsport events, such as Formula 1, timing equipment located around the racing circuit (e.g. at the start/finish line), can communicate with communication equipment located on the racing cars to log times and positions of the cars. This information is then displayed to spectators at the circuit on one or more display screens located around the circuit. For spectators watching the event on a television, the information may be displayed by a producer of the television broadcast in a manner such that the spectator can obtain position and other information of the race on their television screen.

It may be difficult for spectators, whether at the circuit or watching the event on television, to determine the race position of each vehicle. In order to do so, the spectator may have to look away from the race, for example onto a scoreboard or part of the television screen at the side or below the actual race footage. This may cause a viewer to miss an aspect of a race, for example an overtaking manoeuvre.

SUMMARY OF CERTAIN INVENTIVE ASPECTS

According to a first aspect there is provided an information display module for a motor-racing vehicle comprising: a housing attachable to the motor-racing vehicle; a display configured to display race-related information to spectators of a race, said information display module configured to use received information to determine the race-related information to be displayed, said race-related information comprising a relative position of said vehicle to one or more other vehicles in said race.

According to some embodiments, said received information comprises the relative position of said vehicle.

According to some embodiments, said information display module is configured to use the received information to determine the relative position of the vehicle.

According to some embodiments, said information display module is directly attachable to said vehicle.

According to some embodiments, said information display module is attachable to a camera unit of said vehicle.

According to some embodiments, said information display module is attachable to a rear wing of said motor-racing vehicle.

According to some embodiments, said display comprises a display surface configured to be disposed in a plane that is substantially parallel to a longitudinal axis of said vehicle, in use.

According to some embodiments, said information display module comprises a plurality of displays.

According to some embodiments, said information display module is configured to display further race-related information.

According to some embodiments, said further race-related information comprises one or more of: race flag information; tyre information; penalty information; pit-stop information; driver name information.

According to some embodiments, said display comprises an LED array.

According to some embodiments, a brightness of said LED array can be varied.

According to some embodiments, said LED array comprises LEDs of different colours.

According to some embodiments, said LED array comprises an OLED array.

According to some embodiments, said information display module is configured to receive said received information from an external source.

According to some embodiments, said external source comprises one or more transmitters at a race venue.

According to some embodiments, the information display module comprises a processor for processing said received information.

According to some embodiments, the information display module comprises a memory for storing said received information.

According to some embodiments, said information display module is configured to be removably attachable to said vehicle.

According to some embodiments, a shape of said information display module is one of: a parallelogram; a trapezium; a square; a rectangle; an oval.

According to some embodiments, said display is recessed in said housing, such that a display surface of said display is substantially flush with an edge of said housing.

According to some embodiments, said housing comprises a rear surface opposing said display surface, said rear surface being substantially planar and parallel with said display surface.

According to some embodiments, said module is configured to connect to one or more of: a memory; a processor, a transmitter; a receiver associated with said vehicle.

According to a second aspect there is provided a motor-racing vehicle comprising an information display module as set forth in the first aspect.

According to some embodiments, the vehicle comprises two or more information display modules.

According to some embodiments, said vehicle comprises a first information display module on a first side of said vehicle and a second information display module on a second side of said vehicle, said first side of said vehicle opposite said second side of said vehicle.

According to some embodiments, said vehicle comprises a camera unit, said information display module attached to said camera unit.

According to some embodiments, said information display module is attached to a rear-wing of said vehicle.

According to some embodiments, said motor-racing vehicle comprises one of: a car; a go-kart; a motorcycle.

According to a third aspect there is provided a camera module for a motor-racing vehicle comprising at least one information display module as set forth in the first aspect.

According to some embodiments, the camera module comprises a stanchion member and a cross-member together defining a T-shape.

According to some embodiments, the camera module comprises an information display module at either end of said cross-member.

According to a fourth aspect there is provided an information display module for a motor-racing vehicle comprising: a housing attachable to the motor-racing vehicle; a display configured to display race-related information to spectators of a race, said information display module configured to use received information to determine the race-related information to be displayed.

According to a fifth aspect there is provided a motor-racing vehicle comprising an information display module as set forth in the fourth aspect.

According to a sixth aspect there is provided a method comprising: receiving, at a motor-racing vehicle during a race, information from an external source; and using said information received from an external source to display on a display connected to said motor-racing vehicle race-related information to spectators of said race, said race-related information comprising a relative position of said vehicle to one or more other vehicles in said race.

According to a seventh aspect there is provided a computer program comprising computer executable instructions which when run on one or more processors perform the method of the sixth aspect.

According to an eighth aspect there is provided a motor-racing vehicle substantially as described herein with reference to the accompanying drawings.

According to a ninth aspect there is provided an information display module substantially as described herein with reference to the accompanying drawings.

According to a tenth aspect there is provided a camera module substantially as described herein with reference to the accompanying drawings.

According to an eleventh aspect there is provided a fairing for a vehicle comprising: a main body portion having a first end and a second end; a camera mounting portion located between said first end and said second end; the camera mounting portion comprising a mounting for enabling a camera to be removably attached to said fairing, and the camera mounting portion configured for enabling a camera to be at least partially enclosed in said fairing when attached to the mounting.

According to some embodiments, said camera mounting portion is located approximately mid-way between said first end and said second end of said fairing.

According to some embodiments, said camera mounting is located proximate one of said first end and said second end of said fairing.

According to some embodiments, the camera mounting is comprised on an underside of said fairing.

According to some embodiments, the camera mounting comprises a bracket hinged to the underside of the fairing.

According to some embodiments, the fairing comprises an aperture in said main body portion, the camera mounting positioned so that a lens of a camera is proximate said aperture when a camera is attached to the mounting.

According to some embodiments, the aperture comprises a protective screen.

According to some embodiments, the fairing comprises a raised portion for accommodating said camera mounting portion.

According to some embodiments, said camera mounting portion comprises a recessed portion in said main body portion, the recessed portion comprising a first side surface, a second side surface, and a rear surface.

According to some embodiments, said mounting is positioned proximate to said rear surface.

According to some embodiments, said fairing comprises means for enabling a position of a camera in said mounting to be adjusted.

According to some embodiments, said mounting comprises a standardised camera mount.

According to some embodiments, said standardised camera mount comprises one of: a ¼-20 UNC thread; a ⅜-16 UNC thread.

According to some embodiments, the fairing comprises a portion for receiving a remote control for a camera.

According to some embodiments, said fairing comprises mounting means for mounting said fairing to said vehicle.

According to some embodiments, said main body portion comprises a plastic material.

According to some embodiments, said fairing comprises a front fairing for a go-kart.

According to some embodiments, said first end comprises a front end and said second end comprises a rear end of said fairing.

According to some embodiments, the fairing comprises an information display module.

According to some embodiments, said information display module is for displaying information including: countdown information until a start of a race; driver grid position; race position information.

According to some embodiments, said information is received from an external apparatus.

According to some embodiments, the fairing comprises an information display module as set forth in the first aspect.

According to a twelfth aspect there is provided a vehicle comprising a fairing as set forth in the eleventh aspect.

According to some embodiments, said vehicle comprises a go-kart.

According to a thirteenth aspect there is provided a method of manufacturing a fairing as set forth in the eleventh aspect, said method comprising at least one of: injection moulding; vacuum forming; extrusion.

According to a fourteenth aspect there is provided a fairing substantially as described herein with reference to the accompanying drawings.

Another aspect is a computer program product comprising computer readable instructions stored on a non-transitory computer readable storage medium and, when executed, configured to implement a method comprising: electronically receiving, at a motor-racing vehicle during a race, information from an external source; and using said information received from the external source to display on a display connected to said motor-racing vehicle race-related information to spectators of said race, said race-related information comprising a relative position of said vehicle to one or more other vehicles in said race.

BRIEF DESCRIPTION OF THE DRAWINGS

Embodiments will be described with respect to the accompanying figures in which.

DETAILED DESCRIPTION OF CERTAIN INVENTIVE EMBODIMENTS

Some embodiments will now be described with respect to the accompanying Figures. It will be understood that the description is by way of example and to aid the reader in understanding the described technology, the scope of which is defined by the accompanying claims.

Figure 1:
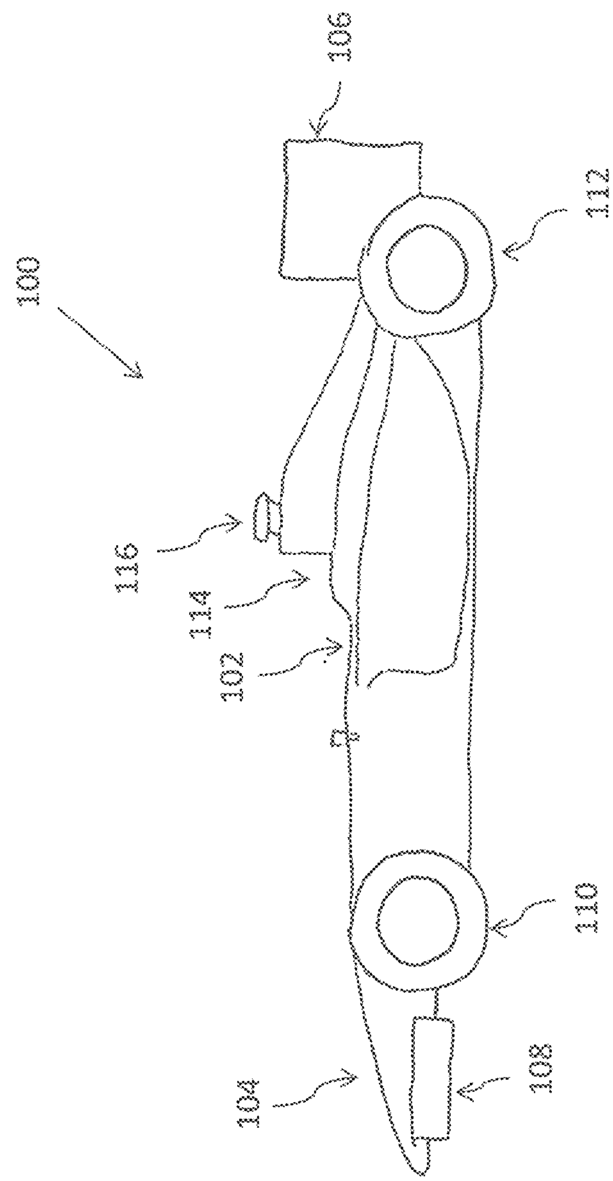
FIG. 1 is a profile view of a motor-racing vehicle.

FIG. 1 is a side view of a Formula 1 car 100. The Formula 1 car comprises a cockpit region 102 for accommodating a driver, located between a nose cone 104 and a rear wing 106. The nose cone 104 comprises a front wing 108. The cockpit 102 is also located between front wheels 110 and rear wheels 112.

Immediately behind the cockpit 102 is an air intake 114. Mounted on top of the air intake 114 is a camera unit 116. The camera unit 116 comprises a camera for taking race footage, and is intended to provide viewers with a "driver's view" of the race. The camera unit 116 also comprises, or is operatively connected to, a transmitter and/or receiver which enables the footage to be transmitted to a circuit side receiver such that it can then be subsequently broadcast, for example to television viewers.

The car 100 may also comprise a telemetry unit. In some embodiments the telemetry unit is comprised within the camera unit 116. The telemetry unit enables race information to be received and/or transmitted between the car and circuit-side receivers. This enables information regarding the car e.g. engine information, to be transmitted from the car to the team's engineers in the paddock. Information can also be transmitted from the circuit side (e.g. from a transmitter at the start-finish line) to the car 100.

Figure 2:
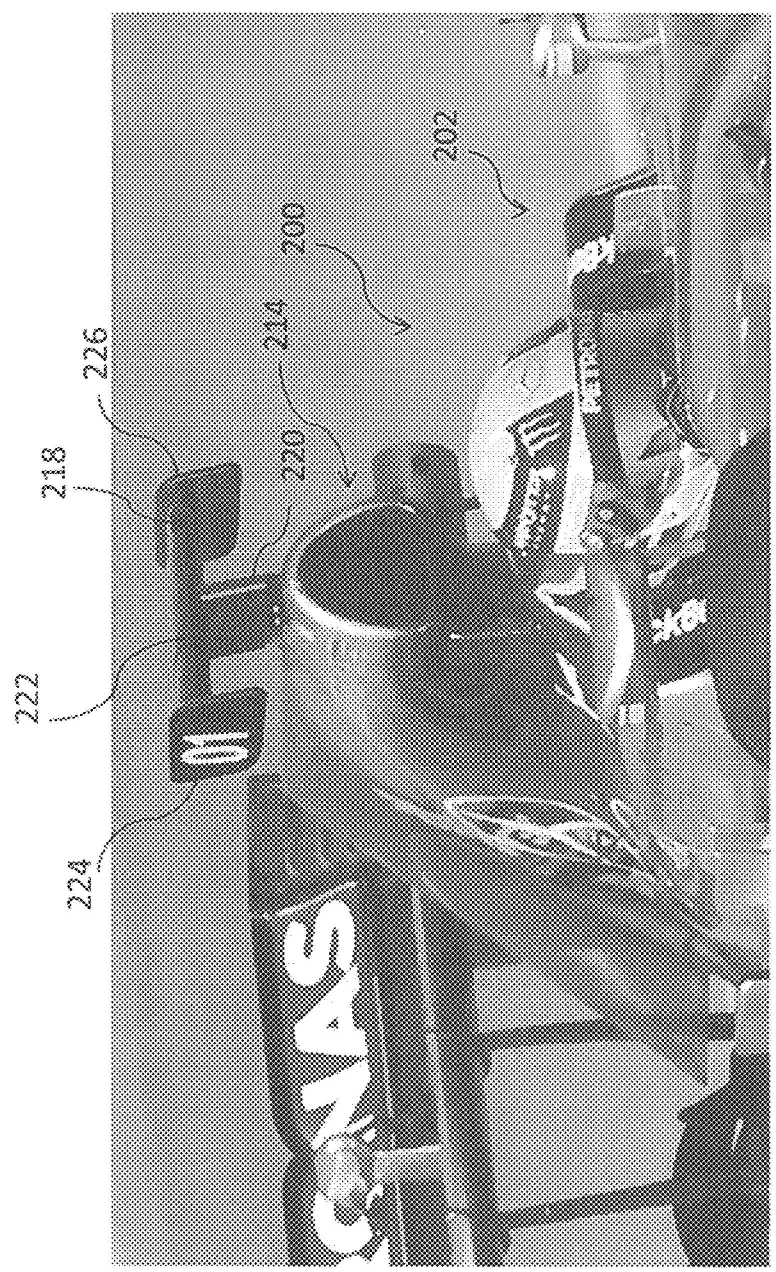
FIG. 2 is a perspective view of a motor-racing vehicle according to an embodiment.

FIG. 2 shows a racing car 200 during a motor race. As per FIG. 1, the racing car 200 comprises a cockpit region 202, behind which is located an air intake 214. On top of the air intake 214 is a camera module 216. The camera module 216 comprises a lens portion 218 for taking race footage. The camera module 216 comprises a stanchion portion 220, and a cross-member portion 222. Together, the stanchion 222 and the cross-member 222 define a T-shape. At either end of the cross-member 222 there are located information display modules 224 and 226, which in this embodiment are in the form of end-plates. These end-plates comprise a display which can display information to spectators of the race, for example race position. In this example the vehicle 200 is currently winning the race, and accordingly the race position "01" is displayed. The car lying in second position will display the race position "02" and so on.

Figure 3:
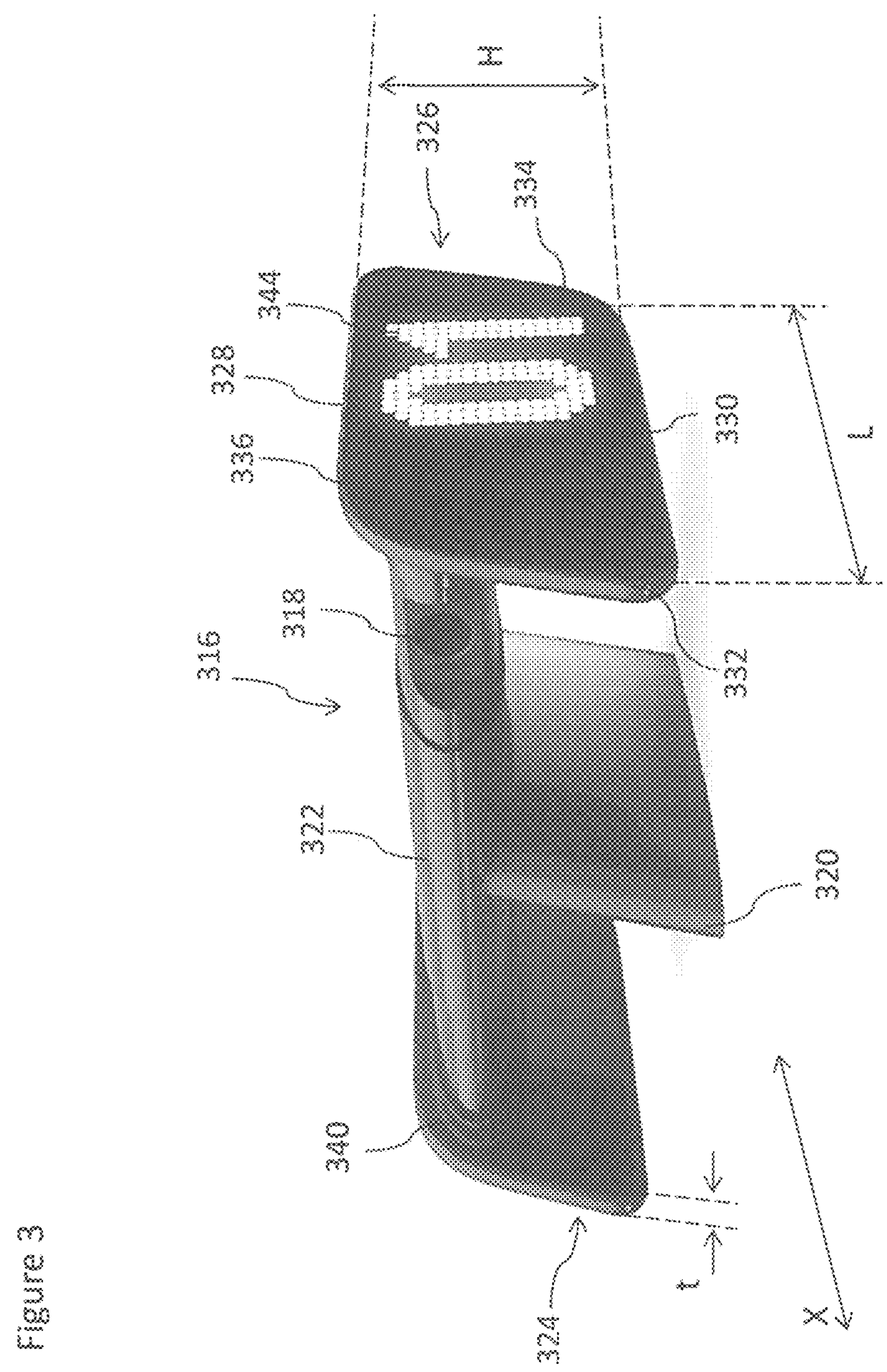
FIG. 3 is a perspective view of an information display module according to an embodiment.

FIG. 3 shows in more detail a camera unit 316 incorporating the electrical information display modules, again comprising end-plates 324 and 326. The camera unit comprises stanchion 320, crossbar 322, and lens 318.

In this embodiment, each end plate is generally trapezoidal (which trapezoid may be a parallelogram) in shape. Referring to end plate 326, it comprises a top edge 328, a lower edge 330, a leading edge 332, and a trailing edge 334. The leading edge 332 is disposed at an acute angle to the lower edge 330. This reduces the drag coefficient of the end plate 326, since the leading edge is angled backwards with respect to the forward direction of motion.

The length of the lower edge 330, L, is in this embodiment in the region of 215 mm. This may also be the length of the top edge 328. The height of the trailing edge 334, H, is in the region of 105 mm. The height of the leading edge 332 may be the same. The end plate also has a thickness or depth, t, in the region of 15 to 20 mm.

It will be understood that although in this embodiment the end-plates are generally trapezoidal in shape, in other embodiments different shapes may be used. For example the end-plates could be square, rectangular, circular, ovalised etc. (see FIG. 14).

The end plate 326 comprises a display panel 336. In this embodiment the display 336 comprises an LED display. As will be understood, the LED display comprises an array of LEDs (light emitting diodes) which can be selectively illuminated to provide information. In this example the LEDs have been illuminated to display the race position “01”. Preferably, the LEDs comprise high power LEDs, which enable the illuminated LEDs to be visible in broad daylight. In some embodiments, the brightness of the LEDs is over 1000 lm (lumen). In some embodiments the brightness of the LEDs is above 1500 lm, and in some embodiments 2000 lm or more. This is by way of example only and LEDs of different brightness may be used. The LED panel may also incorporate an array of RGB (red, green, blue) dot-matrix LEDs, so that different colours can be used. In some embodiments the different colours can be used to display different information.

In some embodiments, the race display unit is capable of varying the brightness of the LEDs. For example if it is detected or determined that it is a sunny day, then the brightness of the LEDs can be increased to ensure that the race information is visible even in direct sunlight. Likewise the brightness can be reduced if full brightness is not required. For example the brightness can be reduced during a night race or in dark conditions. Being able to vary the brightness of the LEDs may reduce the power consumption of the race display unit.

The display 336 may comprise a cover or coating. The cover or coating may prevent damage to the display 336 which may be caused by debris striking the display during a race. Furthermore, the cover or coating may prevent shattering of the display 336 in the event of a collision or crash.

It will be understood that in other embodiment different types of display may be used, for example an LCD display.

In this embodiment the LED display 336 comprises a planar surface. A longitudinal axis is shown by the arrow X. The longitudinal axis X is in a direction parallel to a centre-line of the car 200, running from the front end to the rear end of the car. In this embodiment the planar surface of the LED panel 336 is in a plane which is parallel to the axis X. Therefore when the vehicle is driving in a straight line (e.g. at high speed down a long straight), then it is primarily the leading edge 332 which is cutting through the air. The thickness of the leading edge is minimised so as to minimise air resistance. This may minimise bending stresses on the LED display panel 336 when the vehicle is travelling at high speed during a race.

The end plate 324 comprises an elliptical wall 340 for receiving an elliptical outer profile of the cross-member 322. It will of course be understood that the wall 340 could be any other shape designed to conform with a corresponding shape of the cross-member 322. The end plate can then be attached to the cross member 322 in any way, such as a snap fit, an interference fit, by use of an adhesive, a screw or nut arrangement etc. Preferably the end plate is attachable and detachable from the camera unit 316 as required. It will also be understood that connection between the cross-member 322 and the end plates could be by means of a projection on the cross-member engaging a complementary recess on the end-plate, and vice-versa.

Aside from the attachment portion (e.g. elliptical wall 340), the rear-side of the end plate (i.e. the side opposite the display), is generally planar. This may also help to reduce air resistance caused by the information display module during a race. Each information display module, or end plate, may therefore be considered to be in the form of a plate-like structure.

Although in FIG. 3 the attaching means is shown near the top of the end plate 324, it could be positioned elsewhere on the end plate (e.g. near the bottom, in the middle etc.). That is the information display module comprises an attachment portion for attaching said module to a vehicle, or a camera unit on a vehicle, or any other part of a vehicle (e.g. a wing such as a rear wing). The vehicle may comprise an interface for receiving the attachment portion of the information display module. In embodiments the information display module is removably attachable to the vehicle or part of the vehicle.

The housing of the information display unit may be plastic. In other embodiments the housing could be made from any robust material. The LED display may be recessed in the housing so as to protect the display. In some embodiments a display surface of the display is flush with a lip of the housing.

It will of course be understood that with respect to the description of FIG. 3, the features described with respect to end plate 326 also apply to end plate 324, and vice versa. Although the use of two end-plates on either side of the camera unit is preferred so that spectators on both sides can see a display, it will be understood that the display could be provided on one side only (for example for race tracks where the spectators are always on one side of the vehicle only). Given the orientation of the end-plates in FIG. 3 (i.e. the planar surface of the LED display being parallel to a longitudinal axis of the vehicle), it may be that a spectator standing directly head-on to a vehicle moving directly towards them would not be able to read the display (i.e. because the display is located on the side of the camera unit and accordingly on the side of the car). However the likelihood of a spectator having this position relative to the end plate is small.

The LED display panel 336 comprises an information display area 344. In this example the information display area 344 is displaying a race position in a numerical fashion i.e. “01” (or first place). Other vehicles in the race will have a race position number corresponding to their current position. In this embodiment the information area 344 is positioned on the right hand side of the LED panel 336. It will of course be understood that this information can be provided in any area in which there are LEDs which can be illuminated to provide this information. Preferably, the same type of information (e.g. race position number) is positioned at the same location of the LED panel on each vehicle, so that spectators can quickly ascertain the information. In some embodiments the LED array substantially fills the end plate planar surface. In other examples a portion of the end plate comprises the LEDs.

The style or font used to provide the information in the information area 344 can of course be varied by illuminating fewer, more or a different arrangements of LEDs. Likewise the size of the information displayed can be varied.

Figure 4:
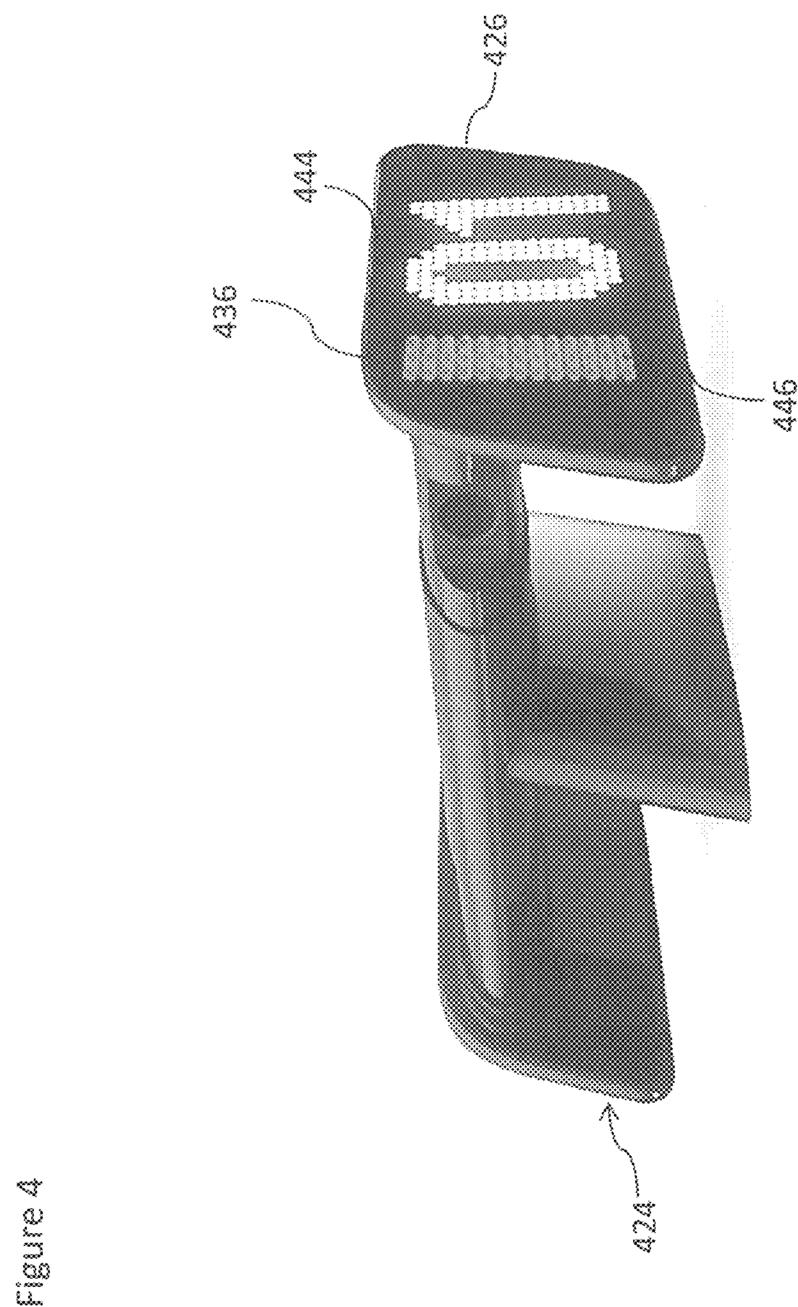
FIG. 4 is a perspective view of an information display module according to an embodiment.

FIG. 4 shows a further embodiment where the LED display 436 of information display module 426 comprises, in addition to first information area 444, a second information area 446. In this embodiment, the first information area 444 provides information of a race position. The second information area 446 can be used to give information regarding a further aspect of the race, for example flag conditions (e.g. a yellow flag condition to indicate the presence of a safety car), tyre strategies (e.g. to show which type or brand of tyre the vehicle is currently using), penalties, pit stops etc. Other information could also be provided such as a current speed of the car, a rev counter etc.

In some embodiments, different colours are used to represent an aspect of the vehicle or the race. For example the second information display area 446 can be used to represent the type of tyre that the vehicle is currently using. For example, the area 446 can be illuminated in red to represent that the vehicle is running on a wet weather tyre, and the colour green could be used to represent the vehicle is running a dry weather tyre. This is of course by way of example only and different colours may be used. Again, it will be understood that these features may also apply to information display module 424.

Figures 5A, 5B, 5C:
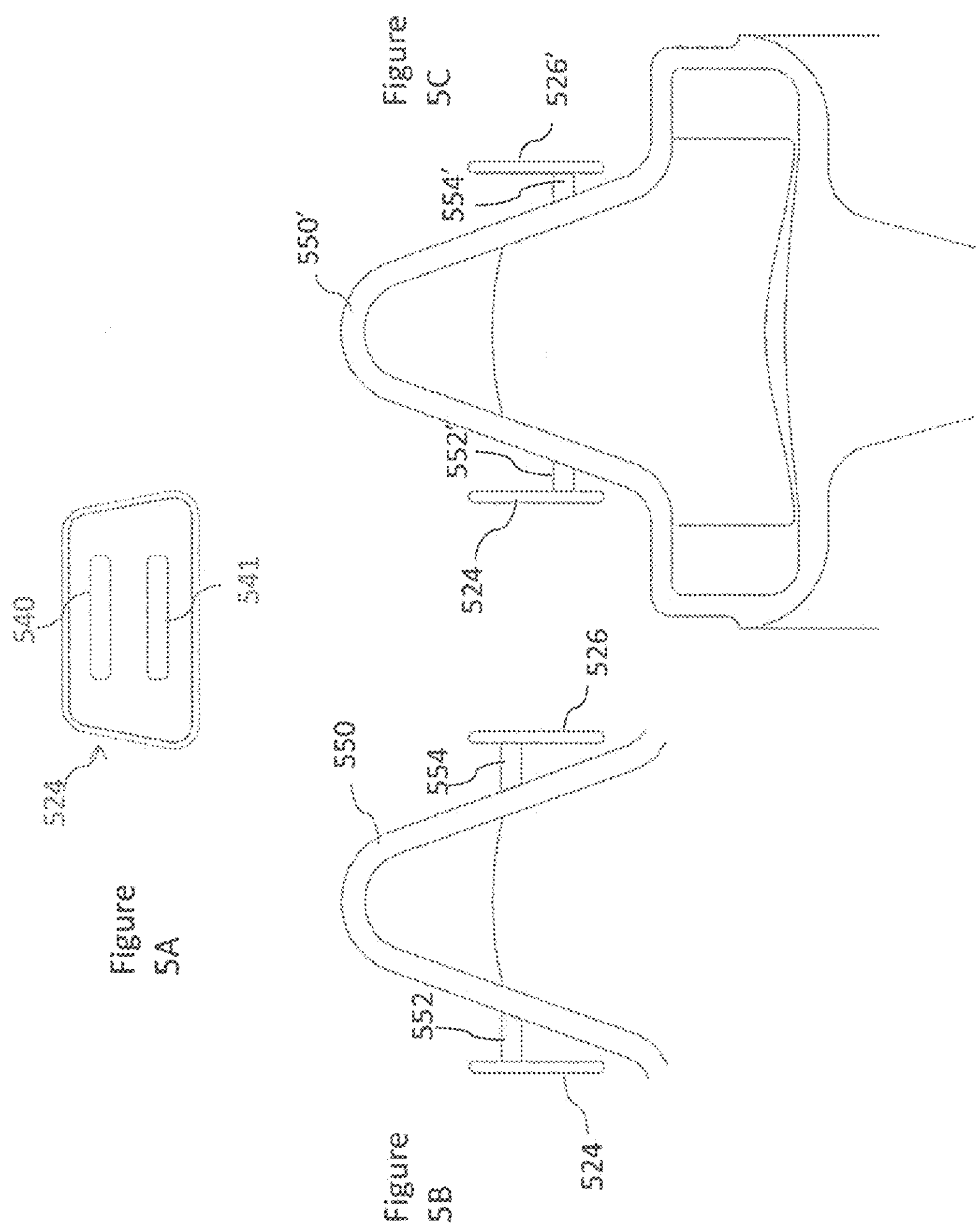
FIG. 5A is a side view of an information display module according to another embodiment.
FIG. 5B is an end view of the information display module of FIG. 5A attached to a vehicle according to a first configuration.
FIG. 5C is an end view of the information display module of FIG. 5A attached to a vehicle according to a second configuration.

FIG. 5A shows a rear side of an end-plate 524 having two attachment portions 540 and 541. The two separate attachment portions enable the end-plate (and accordingly LED display), to be attached in a variety of configurations to the same vehicle or to another vehicle. This is explained in more detail with respect to FIGS. 5B and 5C. FIG. 5B schematically show an open roll-hoop 550 of a motor racing vehicle (not shown). The roll hoop 550 comprises attachment points 552 and 554, enabling end-plates 524 and 526 to be attached. In the example of FIG. 5B the lower attachment point (i.e. attachment point 541 as shown in FIG. 5A) is used to connect the end-plates 524 and 526 to the connection points 552 and 554.

FIG. 5C shows the end-plates 524 and 526 connected to connection points 552' and 554' of another vehicle using the upper connection point (i.e. connection point 540 as shown in FIG. 5A). This results in the end-plates (and accordingly the LED display) to be mounted lower down relative to the roll hoop 550' in comparison to FIG. 5B. This may be useful where the positioning of the end-plate has to be moved or adjusted to account for other items on the vehicle. It will be understood that although the embodiment of FIG. 5A shows two attachment points at the top and bottom of the end-plate respectively, in other embodiments more attachment points may be provided, or other means for adjusting the position of the end-plate relative to the vehicle can be provided. For example a slot extending from the top of the end-plate to the bottom of the end-plate can be provided to meet with corresponding connection means on the vehicle to enable the position of the end-plate to be adjusted with a large degree of freedom.

It will be understood that in addition to the multiple attachment means (or flexible attachment means such as a slot) enabling the same end plate to be attached in a different manner to the same vehicle, it may also enable the same end plate to be attached to different vehicles. This enhances the flexibility of use of the information display module.

Figure 6:
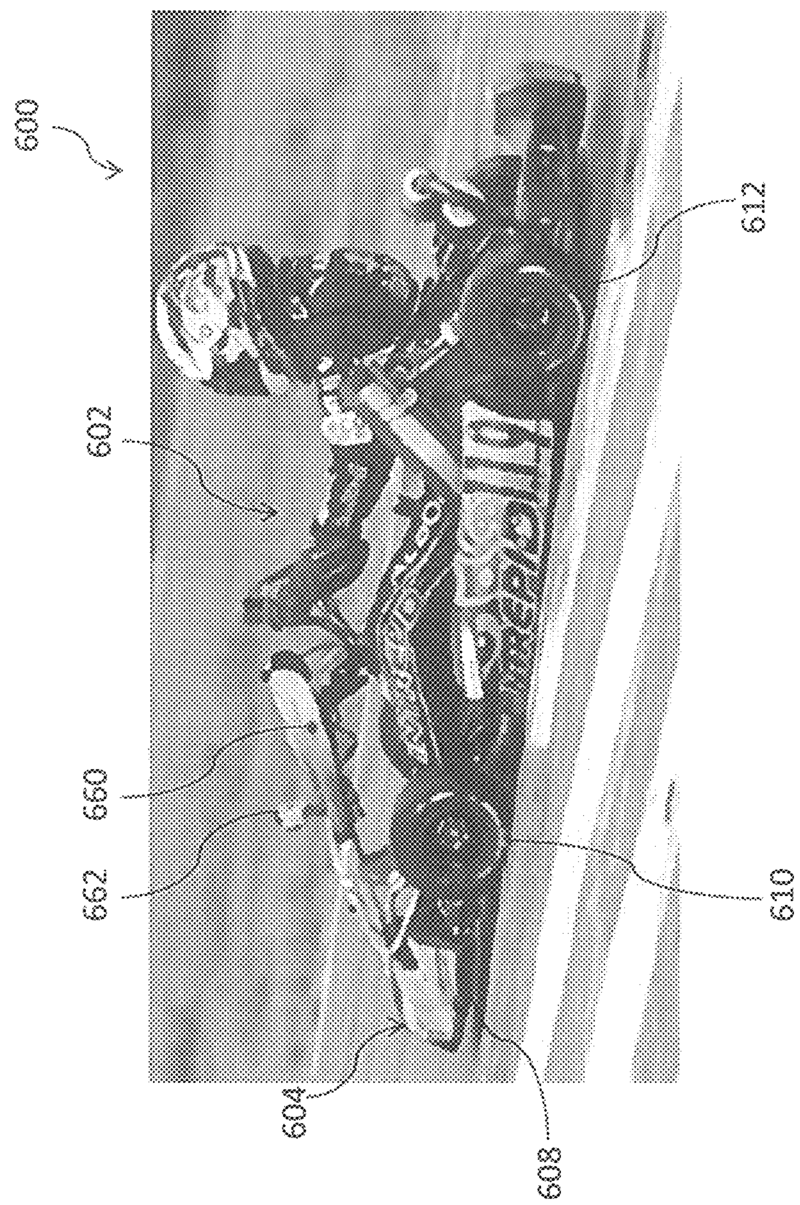
FIG. 6 is a side-view of a go-kart.

FIG. 6 shows a go-kart 600. The go-kart 600 comprises a cockpit portion 602 in which a driver sits, between front wheels 610 and rear wheels 612. The go-kart also comprises a nose portion 604 which comprises a wing/bumper 608. The front end of the go-kart also comprises a panel or fairing 660, or more particularly a front-fairing 660. The fairing 660 can provide some protection to the driver, for example protection from flying debris on the track. The fairing may also act to improve aerodynamic efficiency of the go-kart 600. The fairing 660 can also be used as a mounting point, for example for a camera 662.

Figures 7A, 7B:
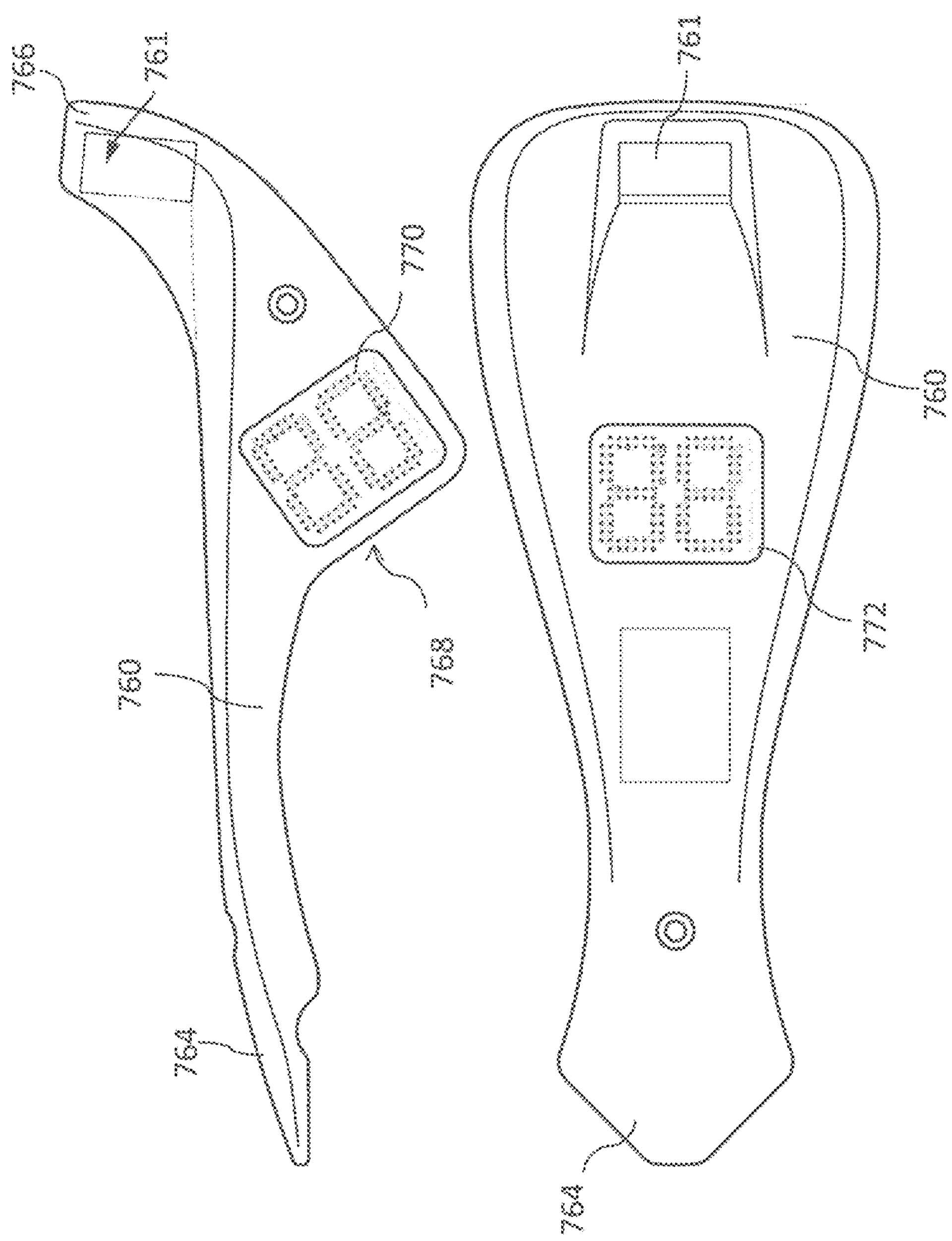
FIG. 7A is a side view of a go-kart fairing comprising an information display module according to an embodiment.
FIG. 7B is a plan view of a go-kart fairing comprising an information display module according to an embodiment.

FIG. 7A is a side view of such a fairing. The fairing 760 comprises a front end 764 and a rear end 766. The fairing 760 also comprises a flared region 768 in the region of rear end 766. It will be understood that the rear end 776 of the fairing is in front of the driver when mounted to a go-kart, for example as shown in FIG. 6. As shown in FIG. 7A, an LED panel 770 is provided on the flared region 768. This LED panel can operate in the same manner as that described with respect to FIGS. 2 to 5 so as to provide race information. The fairing 760 also comprises a camera mount 761, for mounting for example a Go-Pro® camera.

FIG. 7B is a plan view of the fairing 760. FIG. 7B shows an LED panel 772 located between the front end 764 and the rear end 766 of the fairing. The LED panel 772 can be in addition to or alternative to the LED panel 770 shown in FIG. 7A. Further LED panels can also be provided elsewhere on the fairing, and indeed elsewhere on the go-kart.

Figure 15:
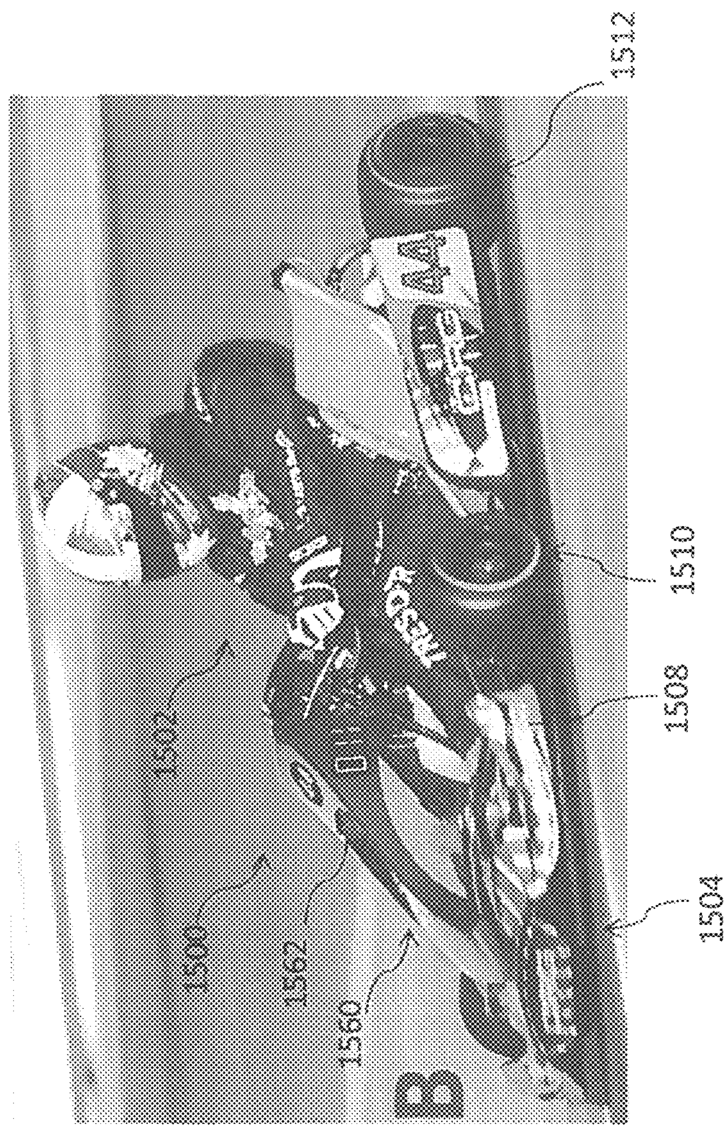
FIG. 15 shows a go-kart incorporating a fairing according to an embodiment.

Further embodiments of a go-kart fairing are shown in FIGS. 15 to 17.

Figure 8A:
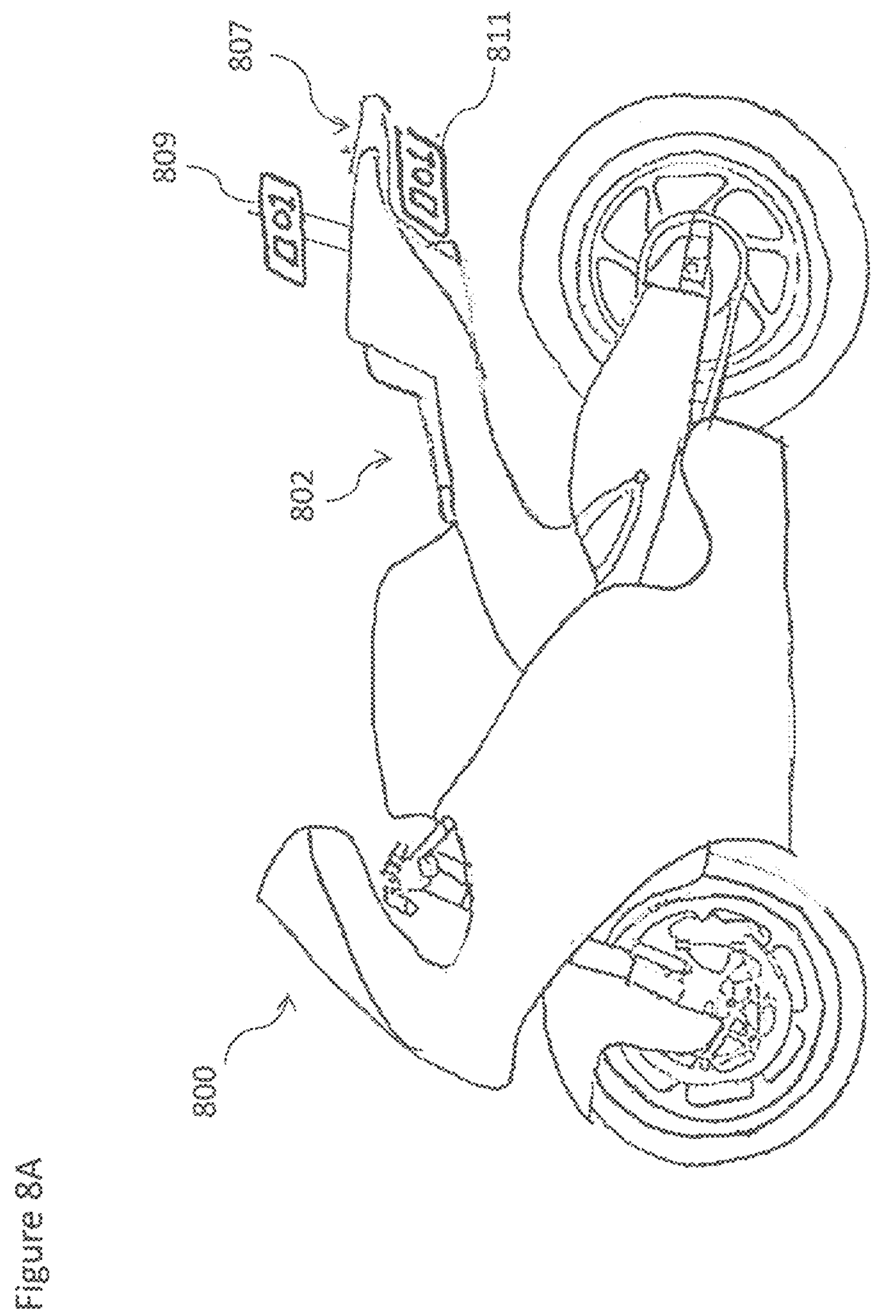
FIG. 8A is a side view of a motorcycle comprising an information display module according to an embodiment.

FIG. 8A is a side view of a motorcycle 800. The motorcycle 800 comprises a cockpit or seat area 802 for seating a driver. The motorcycle 800 also comprises a tail portion 807. According to this embodiment an LED display of the type herein described can be mounted on or proximate to this tail portion. For example the LED display can be mounted on top of the tail portion, as schematically shown at 809. Additionally or alternatively the LED display can be mounted on an underside of the tail portion 807, as shown schematically at 811.

Figure 8B:
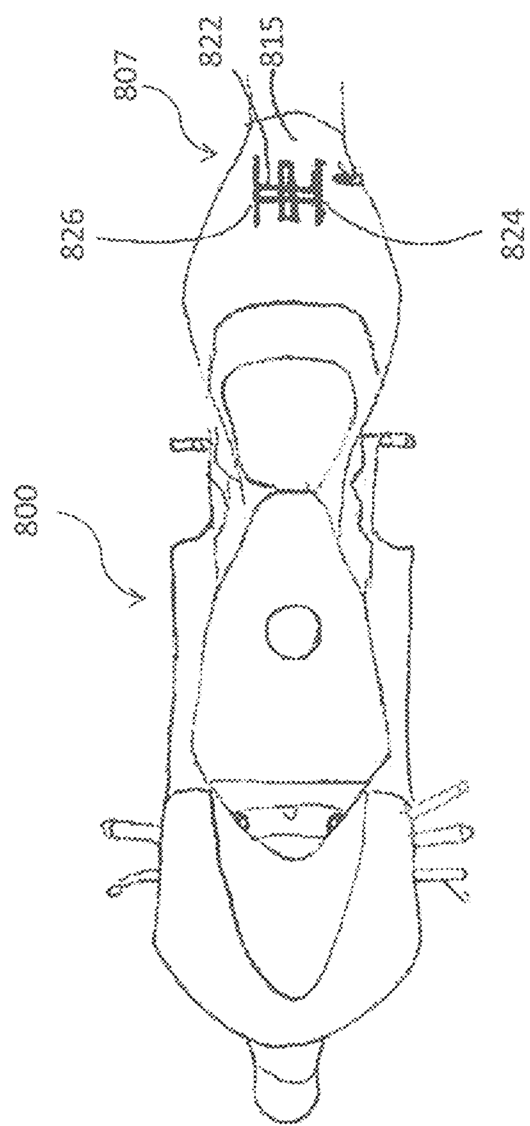
FIG. 8B is a plan view of a motorcycle comprising an information display module according to an embodiment.

FIG. 8B is a plan view of the motorcycle 800. A race display information unit is generally shown at 815. The race display information unit may be similar to that described with respect to FIGS. 2 to 4 i.e. comprising end-plates attached to a T-bar shaped mount. That is the race information display unit 815 comprises LED end-plates 824 and 826 attached to a cross member 822. The unit 815 may also comprise a video camera for obtaining race footage.

Figure 9:
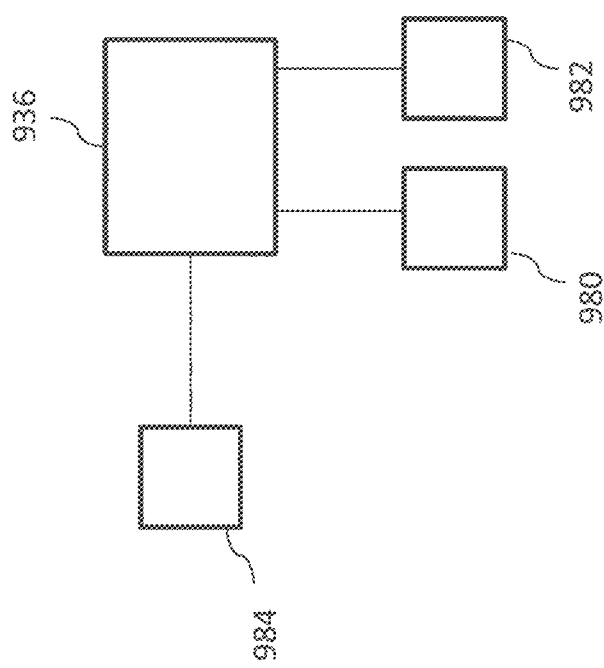
FIG. 9 shows some hardware components associated with an information display module according to an embodiment.

FIG. 9 is a schematic diagram showing hardware components of a race information display module according to some embodiments. A display is shown at 936. The display may be any suitable type of display, such as an LED display. The LED display 936 is operatively connected to a memory 980, a processor 982, and a transceiver 984. This is by way of example only and the entities may be positioned and/or connected in a different manner. For example the transceiver unit 984 may be connected directly to the processor 982 and/or memory 980 rather than directly to the LED display 936. Also, although a unitary transceiver 984 is shown, it will be appreciated that a separate transmitter and receiver may be provided. The LED display 936, memory 980, processor 982, and transceiver 984 may also be comprised in a unitary package on a racing vehicle, or may be separately located items. Also, the LED display 936 may be attachable and detachable to existing memory, processing and transceiver means of a vehicle (or other electrical equipment, such as a camera or telemetry unit, attached to the vehicle). This may require the LED display 936 to be wired in to an existing system.

The transceiver means 984 can be used for receiving information from circuit-side transmitters. For example a circuit side transmitter at the start/finish line may send information to the vehicle comprising a race/lap/split time, and/or race position. This information can be stored in the memory 980. The processor 982 can process this information and send an appropriate signal to the LED display 936 to display information representative of the information received from the track side. For example if the track side transmitter has sent information to the vehicle that the vehicle is in third position, then this information can be stored and/or processed and displayed on the LED display 936, for example by illuminating the appropriate LEDs to represent a number “3”. This information may be stored in the memory 980 for a set amount of time, or temporarily. In some embodiments this information is buffered in the memory, and may be overwritten the next time the vehicle receives race position information. It will therefore be understood that the displayed information is updatable during a race.

The memory 980 may also be configured to store on-board information of the vehicle's performance. For example, the memory may store information regarding the engine or other information that may be useful to an engineering team or to spectators. This information can be transmitted from the motor vehicle via the transceiver 984 to a circuit side receiver. It will be understood that any telemetry information can be stored and/or transmitted from the vehicle in this or a similar manner.

In some embodiments, the LED display 936 is configured to simply attach to an existing on-board system of a vehicle. The LED display 936 is then connected to the on-board data system in an appropriate manner to obtain the on-board information and to display it on the LED display 936.

Suitable software and/or firmware may be stored on and/or embedded within the race information display module to aid control thereof.

The features described with respect to FIG. 9 are applicable to any or all of the various embodiments of the race information display module as described in this application.

It will be understood that the term "race" covers any scenario in which one vehicle is competing with another vehicle. The two cars do not have to be competing simultaneously. For example the embodiments may cover time-trial racing or qualifying where vehicles take it in turns to try and post the fastest time. Information could be obtained at one or more checkpoints on a circuit or stage to show the vehicle's relative position at that checkpoint. The term "race" does of course also encompass a multi-car race, such as a Grand-Prix.

Some further embodiments are shown in FIGS. 10 to 14. Features from these embodiments can be combined with any of the preceding embodiments described. Also, the hardware and software elements described with respect to FIG. 9 can be incorporated in any of the embodiments of FIGS. 10 to 14.

Figures 10, 11:
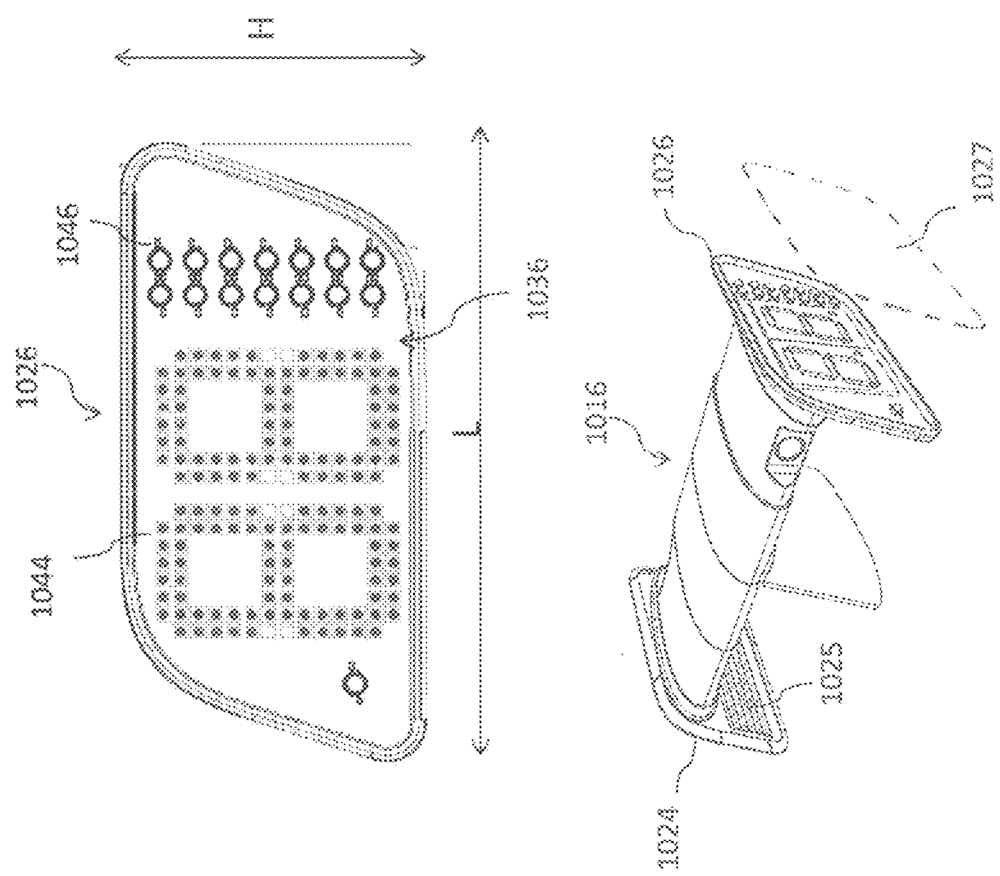
FIG. 10 is a side view of an information display module according to another embodiment.
FIG. 11 is a perspective view of the information display module of FIG. 10 attached to a camera module.

FIG. 10 shows an information display module 1026. The information display module 1026 comprises an array of LEDs 1036. The array of LEDs 1036 comprises a first information display area 1044 and a second information display area 1046. The first area 1044 comprises two blocks of LEDs, each block being in a figure of eight shape. It will be understood that any number can be displayed using the figure of eight array. The second area 1046 comprises a 2×7 array of LEDs. It will of course be understood that a different number of rows and columns can be provided to provide the second information display area 1046. As described with respect to FIG. 4, the first area 1044 can be used to display a race position number, and the second area 1046 can be used to display other information, such as tyre type, pit stop information etc.

Whilst some of the embodiments e.g. FIG. 4 and FIG. 10, enable both race position number and further information to be displayed, it will of course be understood that in some embodiments only the race position number is provided. In other embodiments only the "further" information is provided. The information display module can also be configured to provide only one or both of the race position information and the "further" information, as required. The manner in which the LEDs are arranged can be modified accordingly.

In FIG. 10 the length L of the module 1026 is in the region of 215 mm. The height H is in the region of 105 mm. It will of course be understood that other dimensions are possible. However these dimensions are considered to provide a display large enough for it to be easily seen by a spectator, yet compact enough so as not to dramatically affect the aerodynamics or visual aesthetic of the vehicle, or the weight of the vehicle.

FIG. 11 shows the module 1026 attached to a camera module 1016. FIG. 11 also shows a second information display module 1024 attached to the camera module 1016. On the reverse side of the module 1024 there are extrusions in the form of ribs 1025. These extrusions help to dissipate heat that may be caused by the LED display, so as to stop the display from overheating. The display module 1026 may also comprise such extrusions. Also shown is a screen 1027 which can attach to the front face of the module 1026. This screen comprises an anti-glare surface so as to stop glare that may be caused by sunlight or floodlights, therefore improving the viewing clarity for the spectators. Of course the module 1024 may also comprise such a screen. The screen 1027 also provides protection to the LED display 1036.

Figure 12:
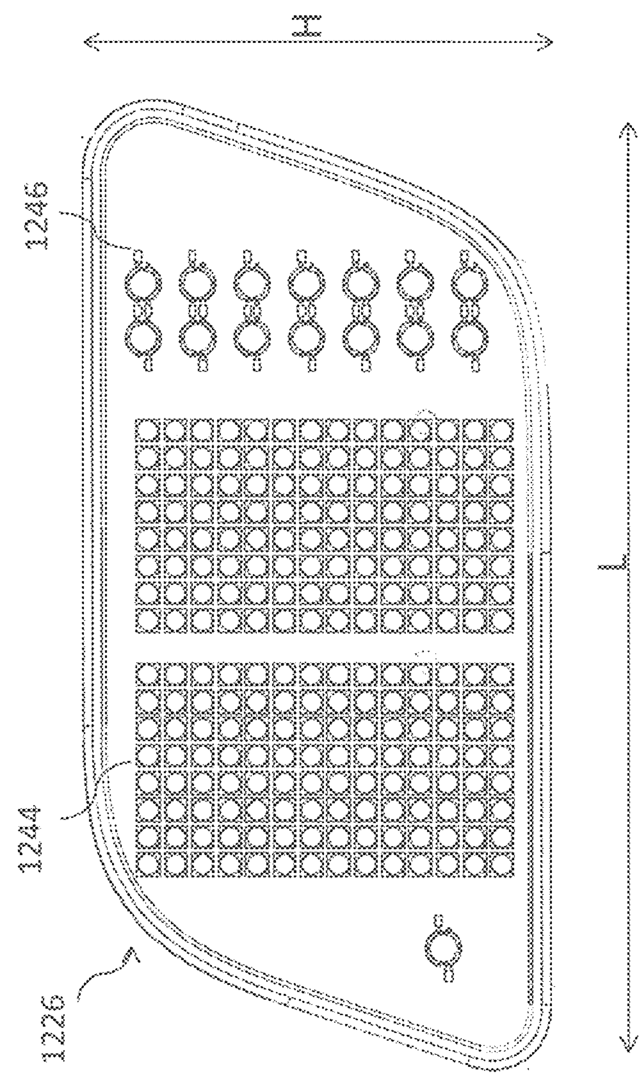
FIG. 12 is a side view of an information display module according to another embodiment.
Figure 13:
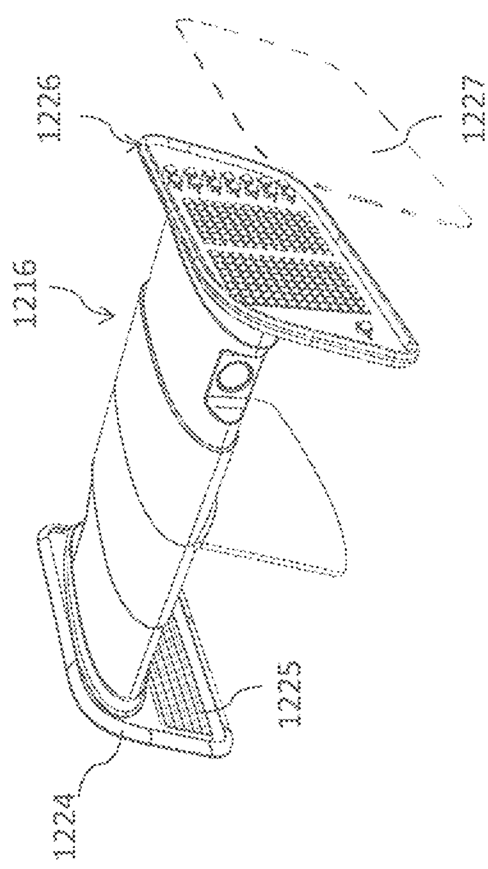
FIG. 13 is a perspective view of the information display module of FIG. 12 attached to a camera module.

FIG. 12 shows a further embodiment where an information display module 1226 comprises a first information area 1244 and a second information display area 1246. In this embodiment the information display area 1244 comprises two blocks of LED arrays. In this arrangement each block comprises an 8×14 array. It will of course be understood that different numbers of rows and columns can be provided in the arrays. The length L is again in the region of 215 mm, and the height H is in the region of 105 mm. FIG. 13 shows the information display module 1226 attached to a camera module 1216. Also shown is module 1224 comprising heat dissipating extrusions 1225. Module 1226 further comprises antiglare screen 1227.

Figure 14B:
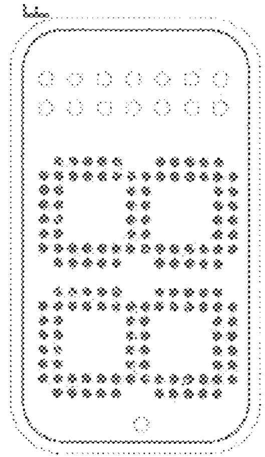
FIGS. 14A, 14B, 14C, 14D, 14E and 14F show a variety of possible different shapes of information display module.
Figure 14D:
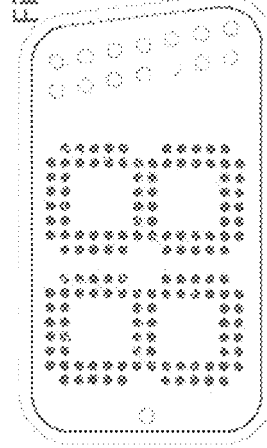
Figure 14F:
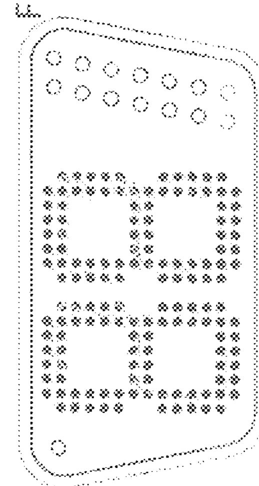
Figure 14A:
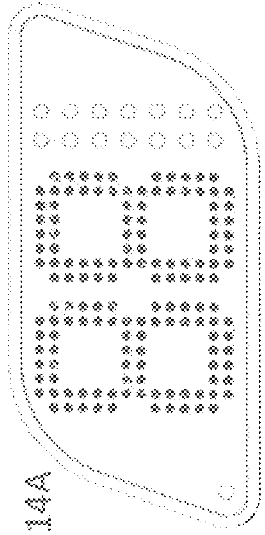
Figure 14C:
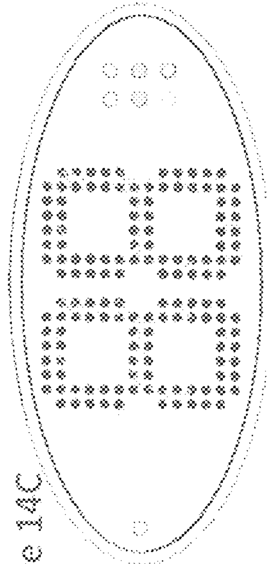
Figure 14E:
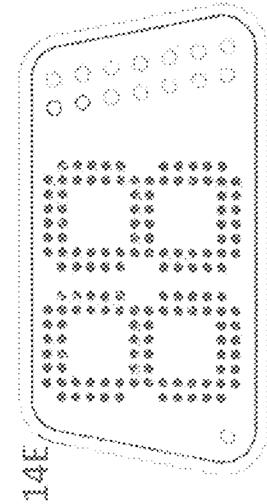

It will be appreciated that whilst certain shapes of display module have been shown in the embodiments it will of course be understood that any shape can be used. Some further examples are shown in FIGS. 14A to 14F. In FIG. 14A the display module has an outer profile in the form of a parallelogram with rounded edges. In FIG. 14B the display module has an outer profile of a rectangle with rounded edges. In FIG. 14C the display has an outer profile of an oval. FIGS. 14D to 14F show different types of trapeziums that can be used to provide the display. These are of course by way of example only and other modifications and shapes can be used.

In some embodiments the information display modules (which may be in the form of end-plates), are detachable to and from the vehicle and/or another part of the vehicle, such as a camera module. That is the display modules may be attachable to and detachable from the camera module. Alternatively the display module can be an integrated part of the camera module. In such embodiments the integrated camera and display module can be provided for attachment to the vehicle.

The information display module (and/or camera) can be powered in any known way. For example the display module can be provided with its own battery. Alternatively the display module can run off a battery of the camera. Alternatively the display module can be powered by an on-board power supply of the vehicle that may also be used to power other vehicle electronic systems.

FIGS. 15 to 17 show further embodiments of a fairing or panel, and a go-kart incorporating such a fairing. It will be understood that the term "fairing" encompasses any type of panel or cover. It will of course be understood that embodiments of the fairing are not limited to go-karts. Embodiments may include variations to the shape of the fairing so that it can be attached to other vehicles, such as a motorcycle or quad-bike or any other type of racing vehicle.

FIG. 15 generally shows some of the main parts of a go-kart 1500. The go-kart 1500 comprises a cockpit portion 1502 within which the driver sits, between front wheels 1510 and rear wheels 1512. The go-kart 1500 also comprises a nose/bumper portion 1504 which comprises a wing 1508. The front end of the go-kart also comprises a panel or fairing 1560. The fairing 1560 can provide some protection to the driver, for example protection from flying debris on the track, as well as providing an aerodynamic function. The fairing 1560 also acts as a mounting point for a camera 1562.

Figure 16A:
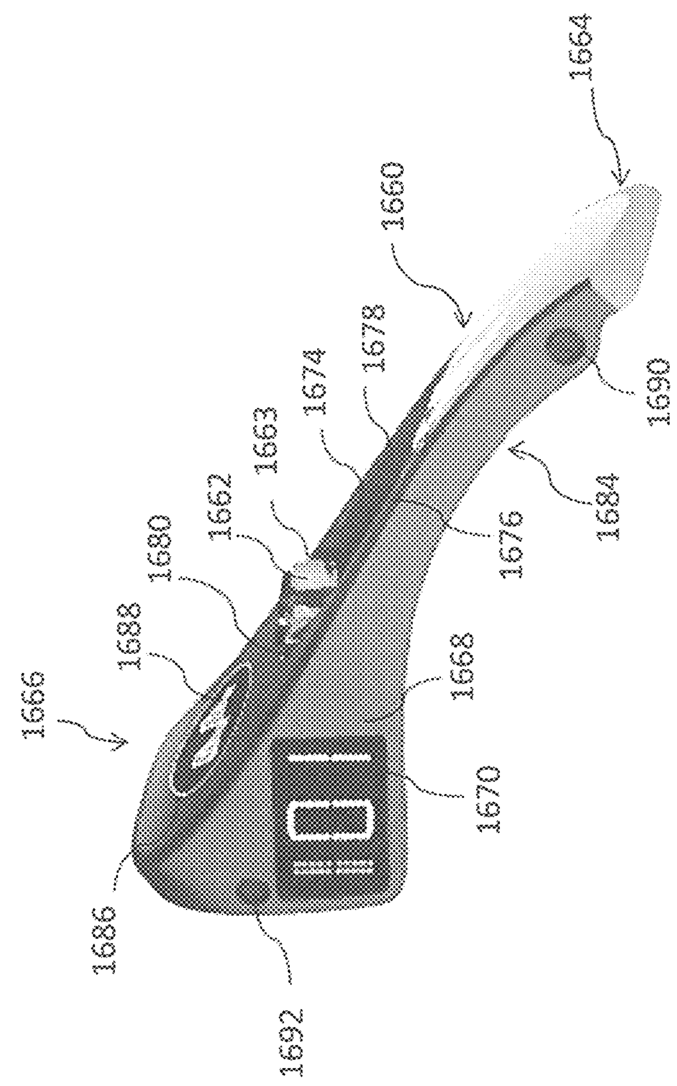
FIGS. 16A, 16B, 17A, 17B, 18A, 18B, 18C and 18D show go-kart fairings according to embodiments.
Figure 16B:
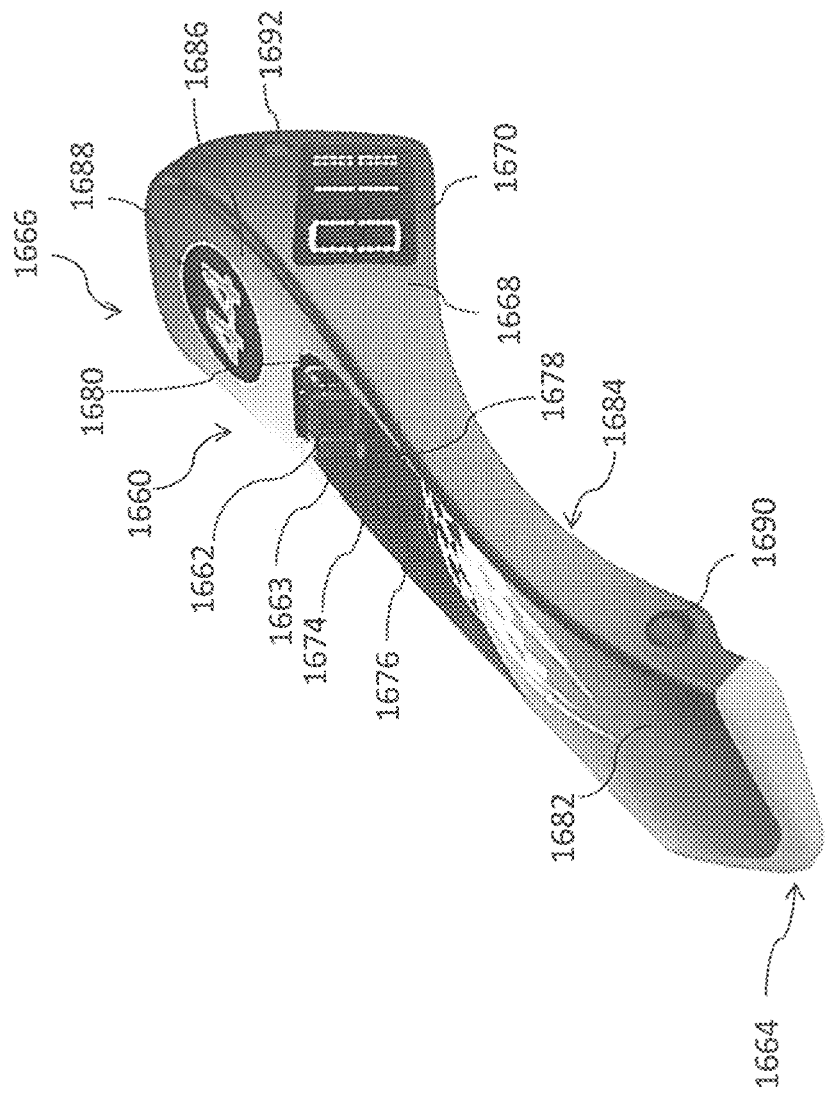

The fairing is shown in more detail in FIGS. 16A and 16B. The fairing 1660 comprises a front end 1664 and a rear end 1666. The front end 1664 is V-shaped for improved aerodynamics.

As shown in FIGS. 16A and 16B, an LED panel 1670 is provided on an enlarged section 1668 of the fairing 1660. This LED panel can operate in the same manner as that described with respect to, for example, FIGS. 2 to 5, so as to provide race information. However it will also be appreciated that the fairing can be provided without such an LED panel.

Between the front end 1664 and the rear end 1666 there is provided a camera mounting portion for receiving a camera 1662. In this embodiment the camera mounting portion is provided in a recessed or scalloped portion 1674. The recessed portion 1674 allows the camera 1662 to be recessed within the fairing, which minimises the aerodynamic drag caused by the camera. The recessed region comprises sidewalls 1676 and 1678, and a back or rear wall 1680.

The side walls 1676 and 1678, and rear wall 1680 may therefore be considered to at least partially enclose the camera 1662 within the fairing 1660. This provides some protection to the camera in use. It may also mitigate the aerodynamic drag that may be caused by the camera in use. It may therefore be considered that in some embodiments the camera is not fully enclosed within the fairing. This gives a user easy access to mount and dismount the camera. In other embodiments a cover may be provided over the recessed portion 1674 so as to fully enclose or substantially fully enclose the camera 1662 between the side walls 1676 and 1678, the back wall 1680 and the cover. At least a portion of the cover will be transparent in the region of the camera lens. The cover may be hinged to the fairing, or otherwise easily movable to allow a user easy access to the camera mounting. The camera 1662 may be mounted to the top surface of the fairing and/or either or both of the side walls 1676, 1678 and/or back wall 1680. The camera may screw in, or be fixed to the faring in any other known way e.g. adhesive, snap fit etc. In this embodiment the camera 1662 also comprises a cover or casing 1663 to protect the camera during use. The camera casing 1663 may be made of a transparent plastic material, at least in the region of a lens of the camera 1662.

The camera may be powered by its own on-board power supply, such as a battery. Alternatively or additionally, the camera may be wired into a power supply on the go-kart 1500 (such as a battery or alternator of the go-kart). The camera 1662 may store image data on a memory card of the camera. The camera may alternatively or additionally also be able to transmit received image data to an external source, such as a trackside receiver. This may enable race footage to be shown to spectators in real-time. The image data may be transmitted via an existing on-board transmitter of the go-kart 1500 or racing vehicle. Such an existing transmitter may be already utilised to transmit telemetry data etc.

As best seen in FIG. 16B, the region between the front end 1664 and the recessed region 1674 comprises a convex region 1682. This channels the airflow in an aerodynamic manner over the fairing 1660.

The underside of the fairing 1660 also comprises a scalloped or arced region 1684 between the front end 1664 and the enlarged portion 1668. This enables the amount of material required to form the fairing to be minimised, and reduces weight.

The rear end of the fairing 1666 comprises a slightly concave region 1686 in the region of race number 1688. This concave region 1686 causes air to be directed off the fairing in an aerodynamic fashion.

The fairing can be manufactured from any suitable material. Preferably the fairing is made from plastic. The fairing may be manufactured in any known way, such as injection moulding, vacuum forming, extrusion etc.

The fairing also comprises front and rear mounting portions 1690 and 1692 for enabling the fairing to be attached to a go-kart or other vehicle.

In the embodiments of FIG. 16A and FIG. 16B the recessed portion 1674 is approximately midway between the front portion 1664 and the rear portion 1666.

Figure 17A:
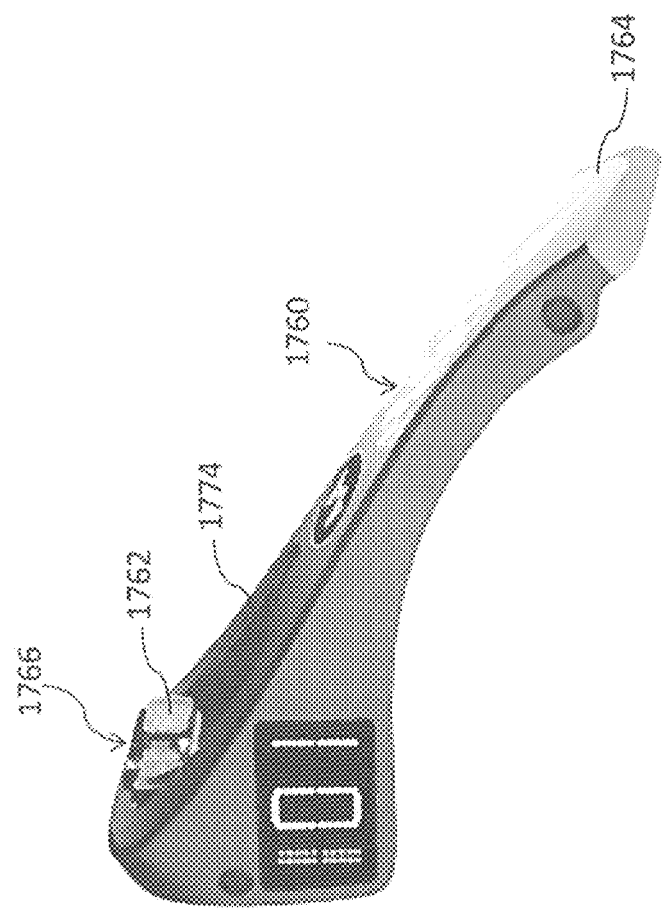
Figure 17B:
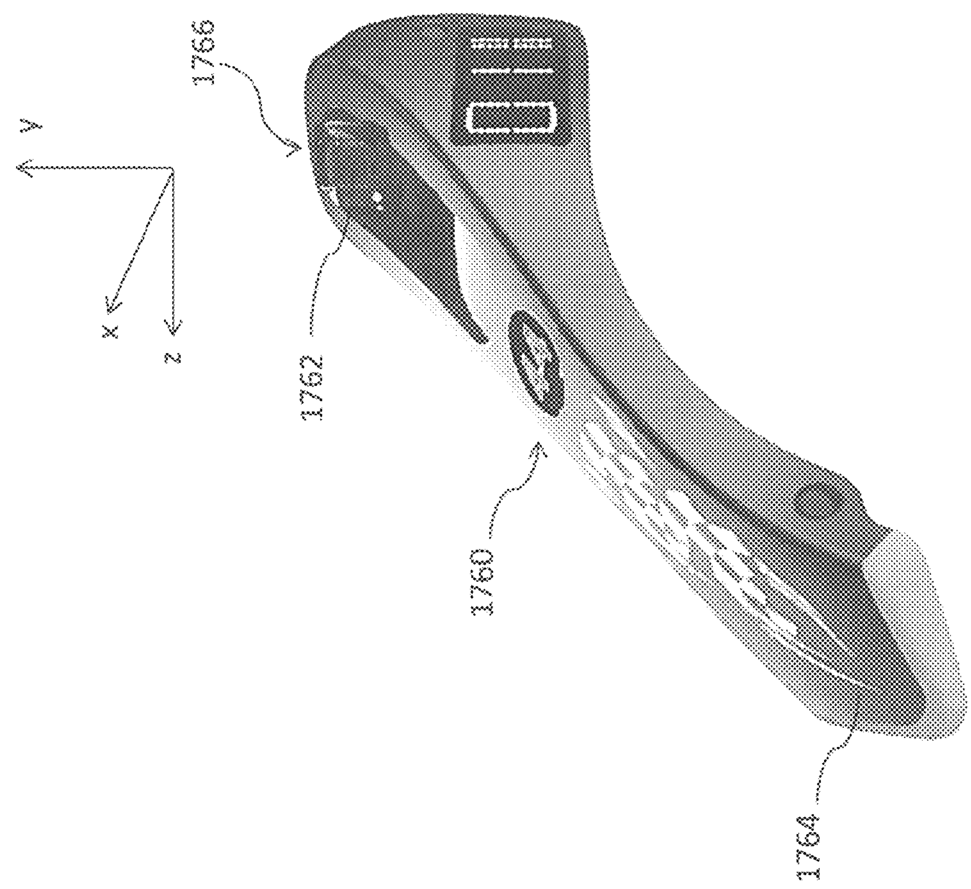

FIGS. 17A and 17B show an alternative embodiment of a go-kart fairing 1760. Many of the features of FIGS. 17A and 17B are shared with the embodiment of FIG. 16A and FIG. 16B, and therefore are not discussed again in full detail. It will be understood that features of the embodiments of FIGS. 16A and 16B and FIGS. 17A and 17B can be combined in any appropriate manner.

In the embodiment of FIG. 17A and FIG. 17B the recessed portion 1774 is positioned further back in the fairing compared with the embodiment of FIGS. 16A and 16B. That is the recessed portion 1774 is proximate to the rear end 1766 of the fairing 1760. In other embodiments the recessed portion 1774, and accordingly the camera 1762, can be positioned at any point along the fairing 1760. For example the recessed portion and camera could in some embodiments be positioned proximate to the front end 1764 of the housing 1760. The recessed portion could indeed be positioned at any point between the front end 1764 and rear end 1766. Indeed, in one embodiment (not shown), the fairing may comprise an elongate recess that extends between the front end 1764 and rear end 1766, the camera 1762 being adjustably mountable at any position between the front and rear end.

In embodiments the position of the camera within the recessed portion may be adjusted. For example means may be provided enabling the position of the camera to be adjusted in a vertical direction (Y direction), lateral direction (X direction), and a depth direction (Z direction). In an embodiment the Z direction is parallel to a longitudinal axis of the go-kart or vehicle, the X and Y directions being perpendicular to the Z direction in different planes. A tripod arrangement may be provided to provide such adjustments. Indeed any means for providing the adjustment may be provided, such as a rotatable screw arrangement. In some embodiments the position of the camera can be adjusted electrically, which may enable the camera position to be adjusted "on-the-fly". In some embodiments adjustment may not be possible i.e. the camera position is fixed, once mounted. In other embodiments the camera position is adjustable in a limited number of directions e.g. any combination of one or two of the X, Y and Z directions.

The camera mounting may be of a standardised form so that users can attach any camera having an associated standardised attachment means. For example, as per ISO 1222:2010, the mounting may comprise a ¼-20 UNC or ⅜-16 UNC thread.

The camera may be any kind of camera, such as a film or digital still or motion picture camera, or a camera capable of both still and motion picture. In some embodiments the camera is a GoPro® camera. Preferably the camera can be easily attached and detached from the fairing.

The fairing may be provided with the camera. Alternatively the fairing may be provided and sold as a separate unit from the camera.

Figure 18A:
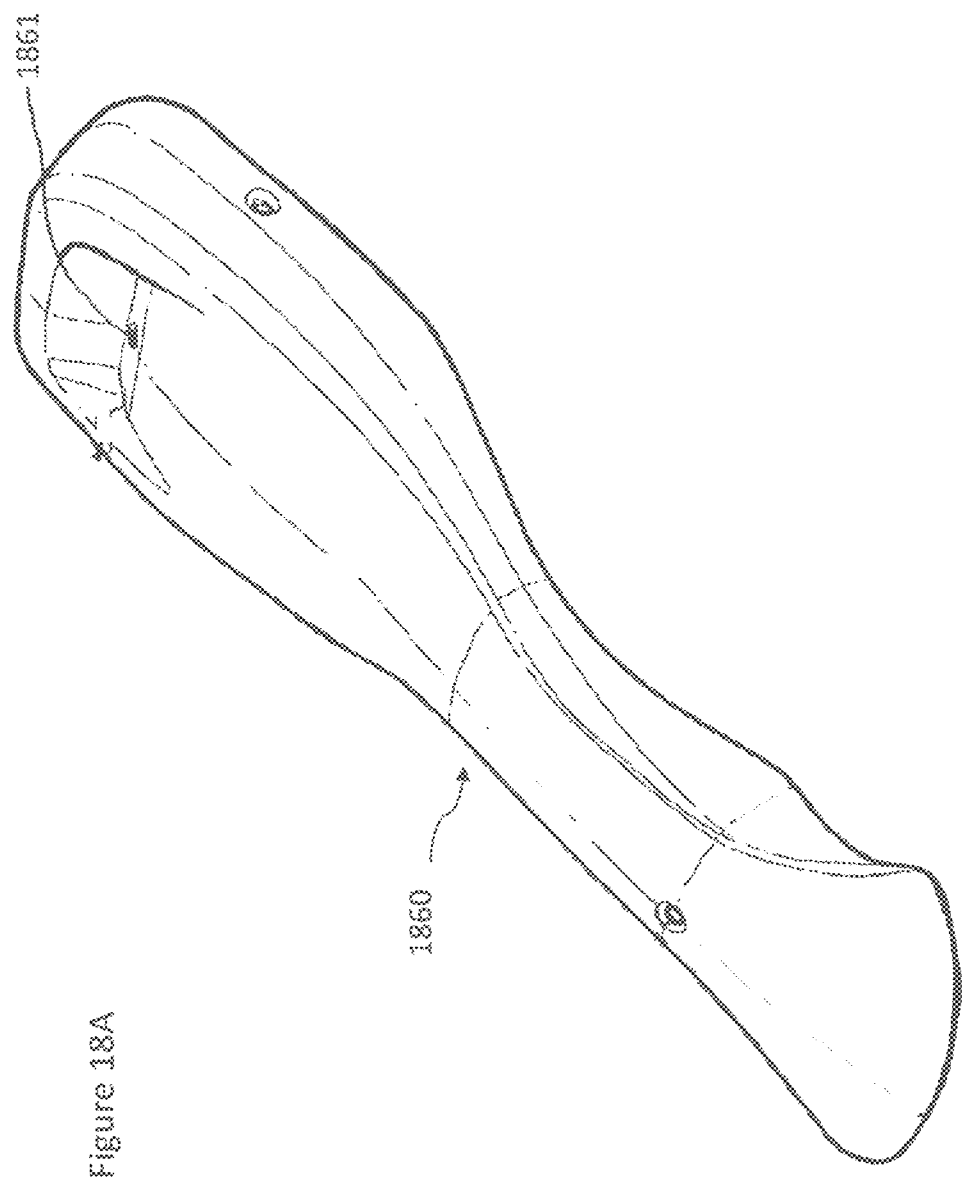
Figure 18B:
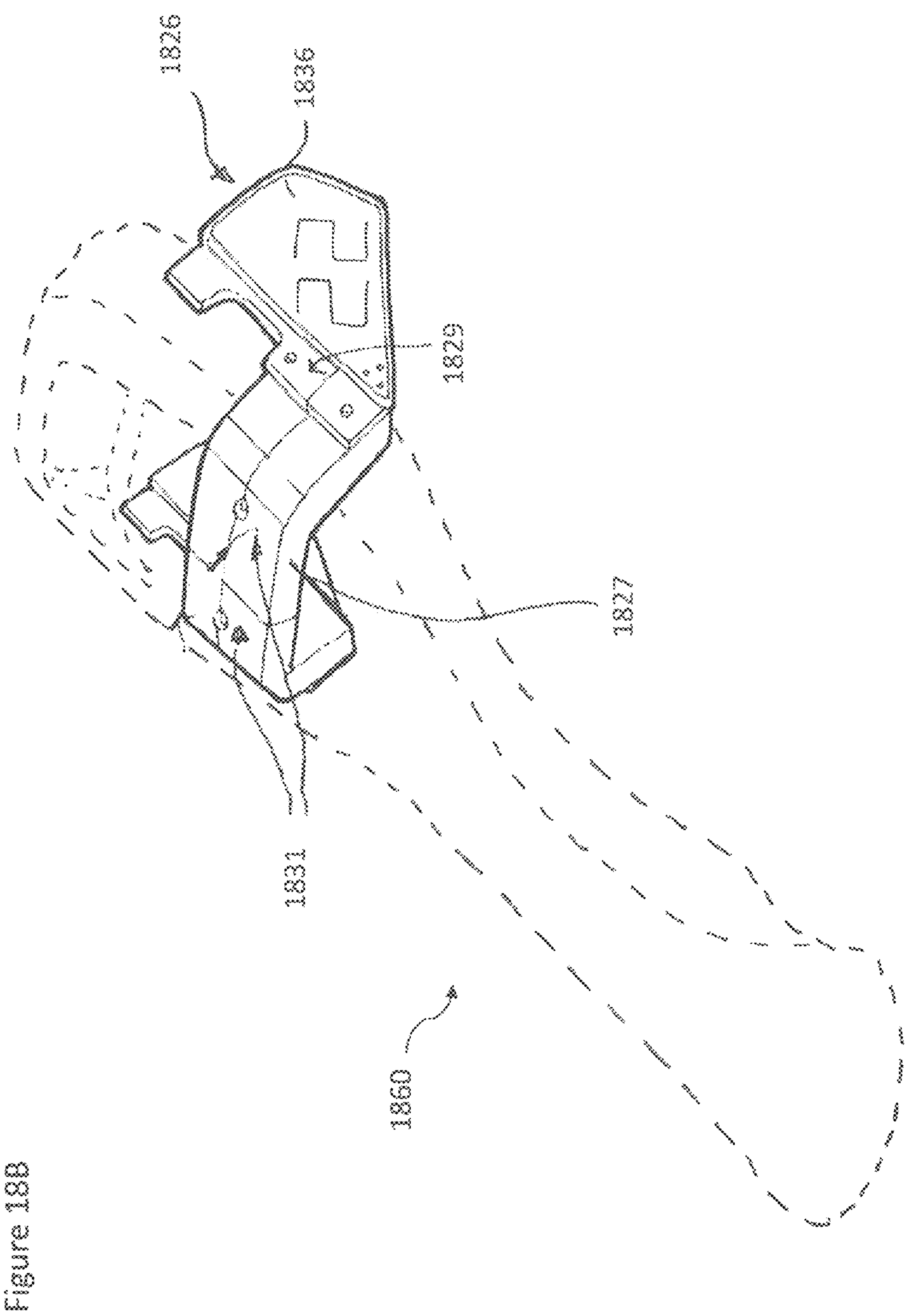
Figures 18C, 18D:
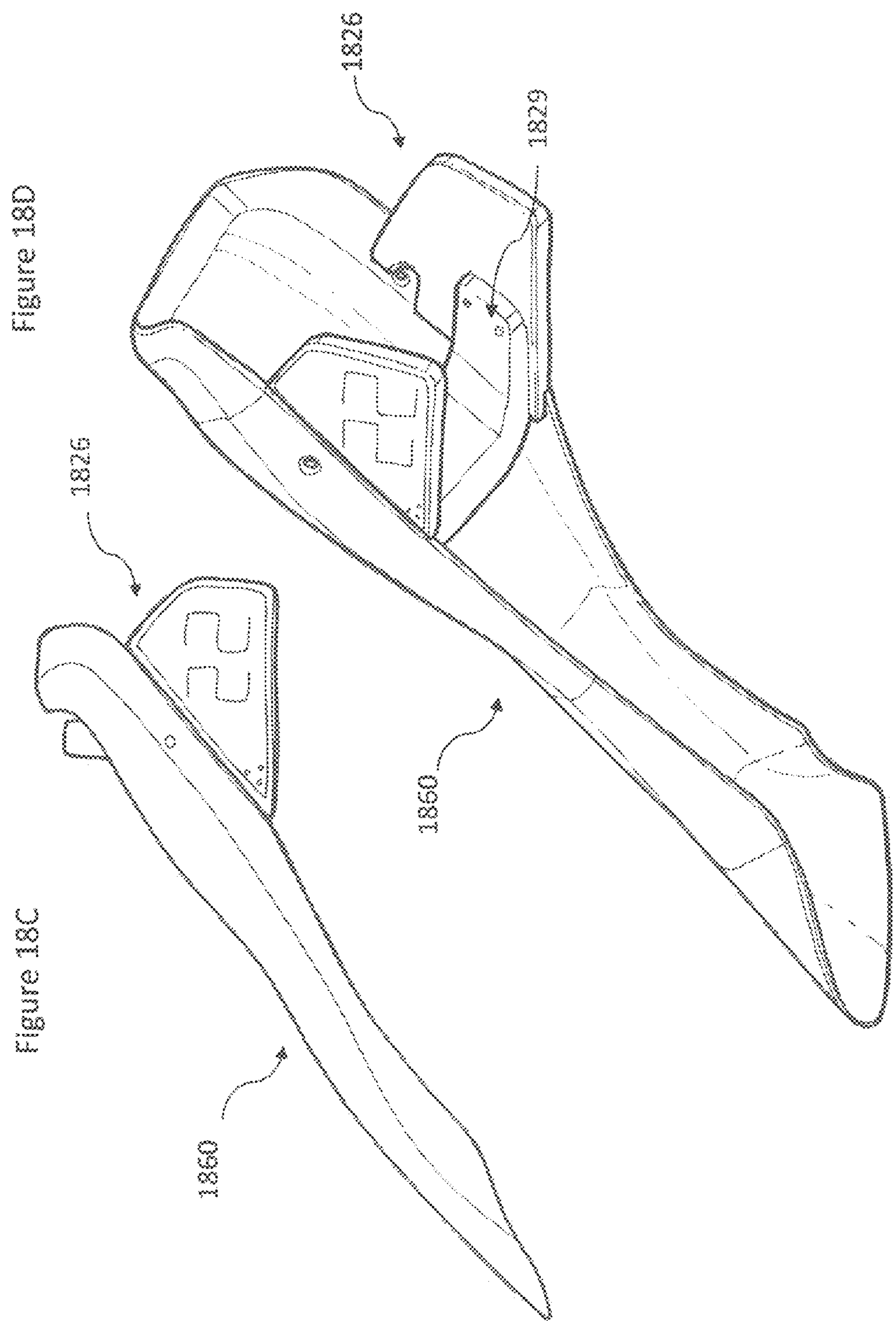
Figure 19:
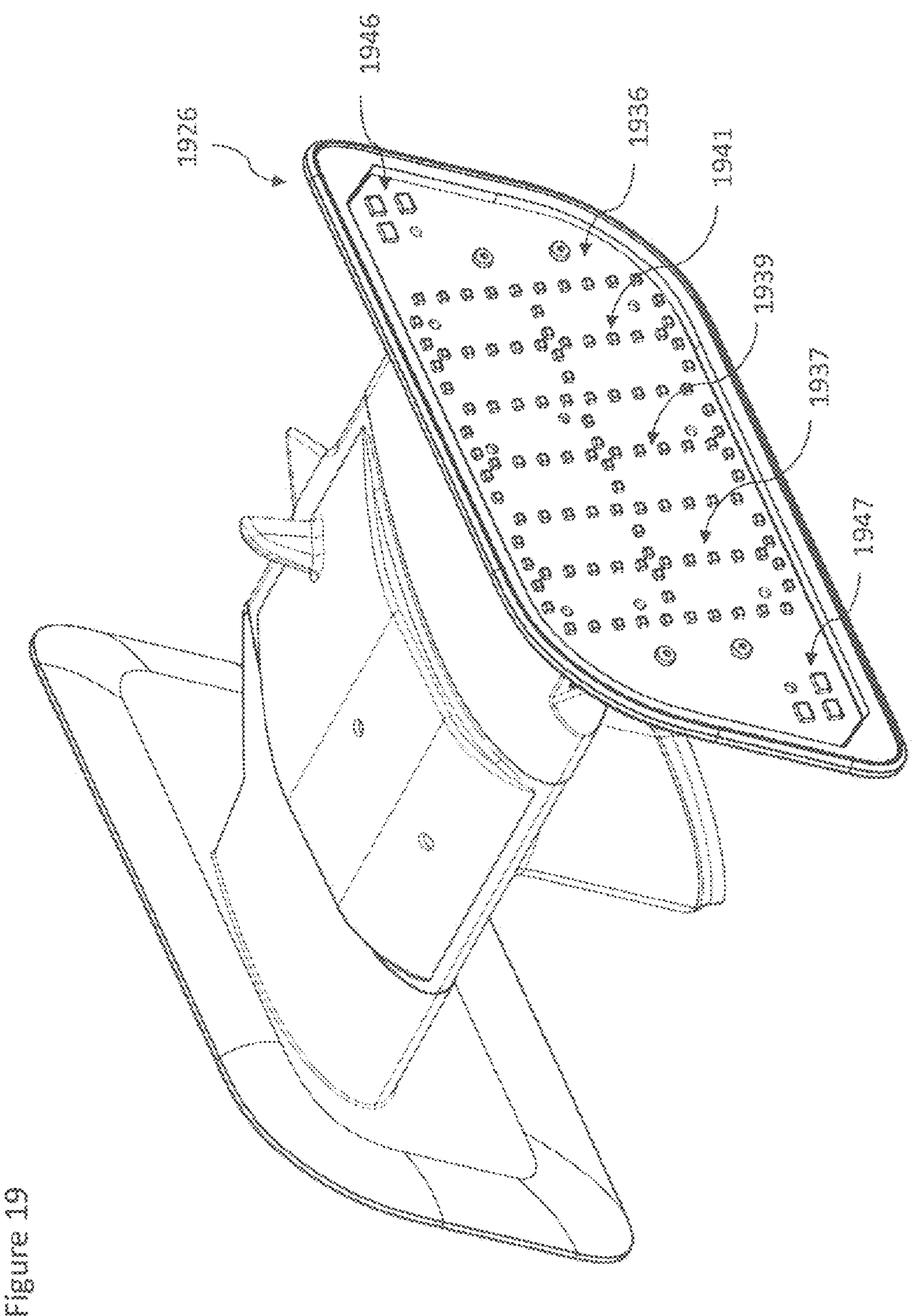
FIGS. 19 and 20 show an information display module according to an embodiment.

Further embodiments of a go-kart fairing are shown in FIGS. 18 and 19.

A fairing 1860 is shown in FIG. 18A. The fairing 1860 comprises a camera mounting position 1861.

FIG. 18B shows an information display module 1826 attached to an underside of the fairing 1860. In FIG. 18B the outline of the fairing 1860 is shown in phantom to clearly show how the information display module 1826 attaches to the fairing 1860. The information display module comprises a display portion 1836. The information display module 1826 may work in the same or a similar manner to the information display modules previously described with respect to other embodiments. A second display may also be provided on the opposite side of the display module 1826 from the display 1836. The information display module 1826 comprises a main body portion 1827 which is of a generally U-shaped profile, so as to conform to the shape of an underside of fairing 1860. This can also be appreciated by viewing FIGS. 18C and 18D. The information display module 1826 can be attached to the main body portion 1827 using a screw arrangement 1829. In other embodiments the display module 1826 can be attached to the body 1827 in any other way, such as a snap fit, adhesive etc. The main body portion 1827 can also be attached to the fairing 1860 with a screw arrangement 1831 (see FIG. 18B). Again, in other embodiments the main body portion 1827 can be attached to the faring 1860 in any other way, such as a snap fit, adhesive etc.

Further embodiments of a fairing are shown with respect to FIGS. 25 to 31.

Figure 25:
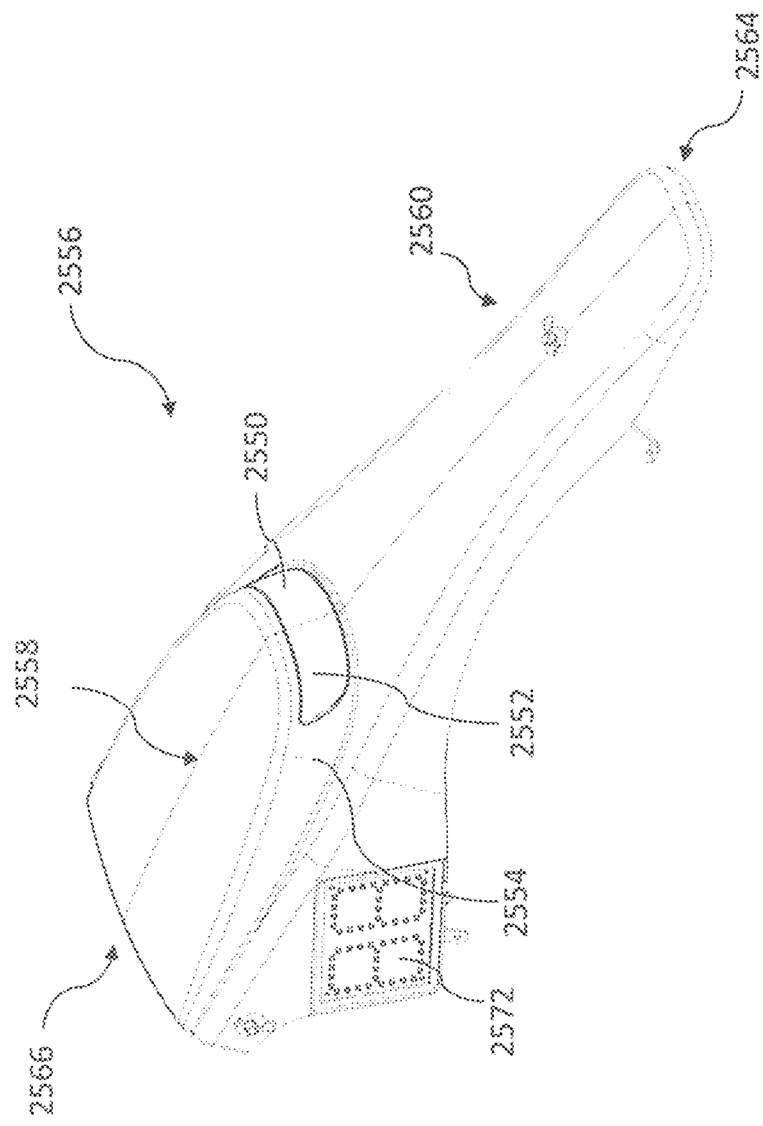
FIGS. 25, 26, 27, 28, 29, 30 and 31 show a go-kart fairing according to a further embodiment.

FIG. 25 shows a fairing 2560 for a go-kart. The fairing comprises a front end 2564 and a rear end 2566. The fairing 2560 also comprises an information display module in the form of LED panel 2572. This information display module may operate in the same manner as the previously described information display modules. The fairing also comprises a raised or enlarged portion 2558 which projects upwardly from a top side 2556 of the fairing 2560. The raised portion 2558 comprises a face 2554, in which is located an aperture 2552. In this embodiment the aperture 2552 is covered with a transparent screen 2550. In this embodiment the transparent screen 2550 is made from a plastic material. In other embodiments the screen 2550 is formed from glass. In embodiments the screen 2550 is shatter-resistant.

Figure 26:
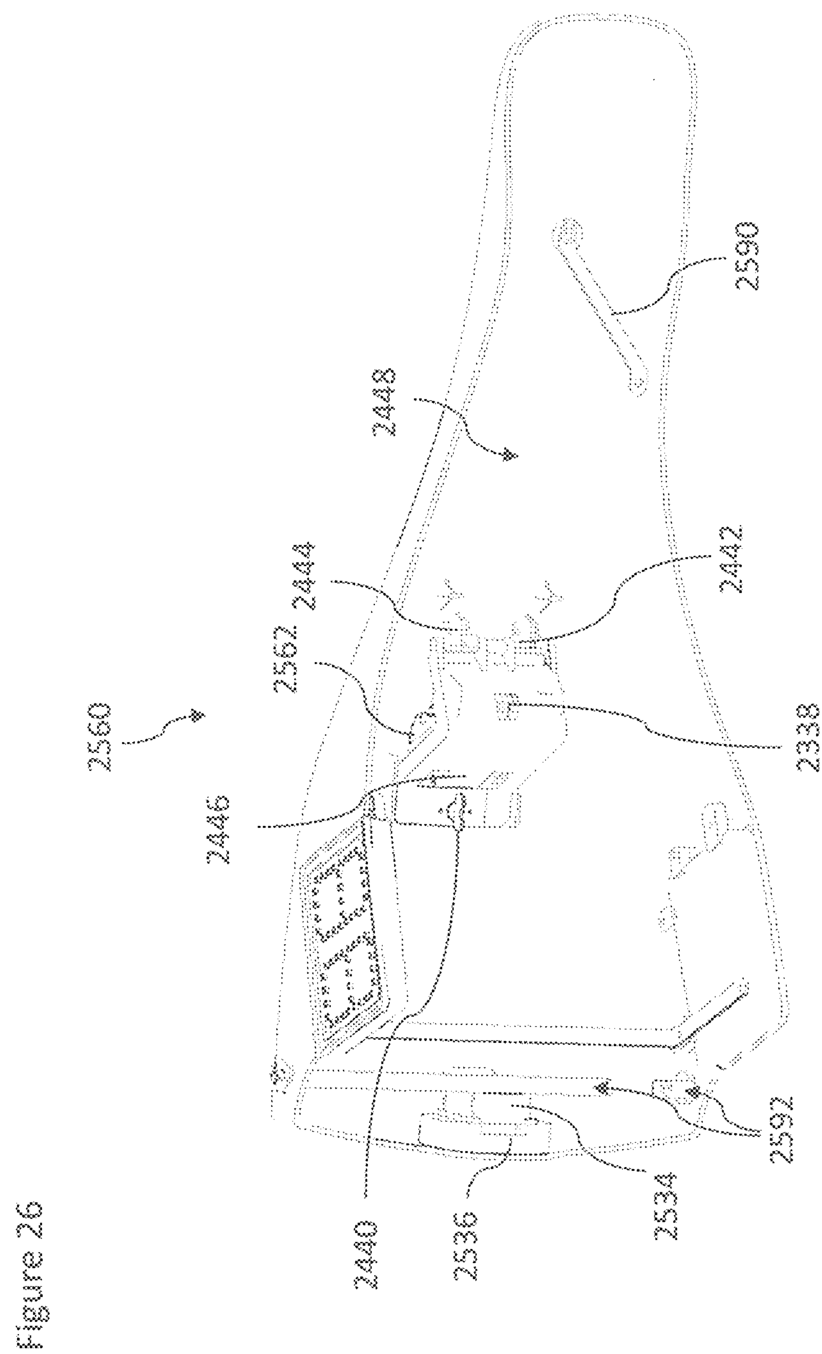

An underside 2448 of the faring 2560 is shown in FIG. 26. From the underside 2448 there is shown a camera mount in the form of a bracket 2446. The bracket may be formed from a moulded plastic material. In this embodiment the bracket 2446 is generally L-shaped. A camera 2562 is also shown in FIG. 26. The bracket 2446 is connected to the fairing 2560 with hinges 2444 and 2442. The bracket 2446 is also attached to the fairing with a quarter turn fastener thumb screw 2440. The camera 2562 can be attached to the bracket 2446 with a fixing means 2338, which may for example be in the form of a standardised screw. It will therefore be understood that according to some embodiments there is provided a go-kart fairing with a camera-mount on an underside of the fairing. An aperture is provided in the fairing to enable a camera mounted on the underside to obtain race footage through the aperture, in use.

In some embodiments a means for attaching the camera 2562 to the bracket 2446 (e.g. a standardised screw arrangement) comprises some adjustability (e.g. in height and/or depth and/or width directions) relative to the go-kart fairing, to enable the position of the camera in the mounting (e.g. bracket 2446) to be adjusted. This enables different cameras, which may have different dimensions, to be used in the mounting and for the position of that camera to be adjusted so that a lens of the camera can be positioned adjacent aperture 2552.

Also shown in FIG. 26 is a remote control 2536 for controlling the camera 2562. The remote control may communicate wirelessly with the camera 2562. In other embodiments a wired connection may be provided. The remote control 2536 is attached to the fairing 2560 with a mounting 2534.

Also shown in FIG. 26 is front mounting portion 2590 and rear mounting portion 2592 which enable the fairing 2560 to be attached to a corresponding mounting point on a go-kart. Also shown is a bracket 2593 for holding the LED display 2572.

Figure 27:
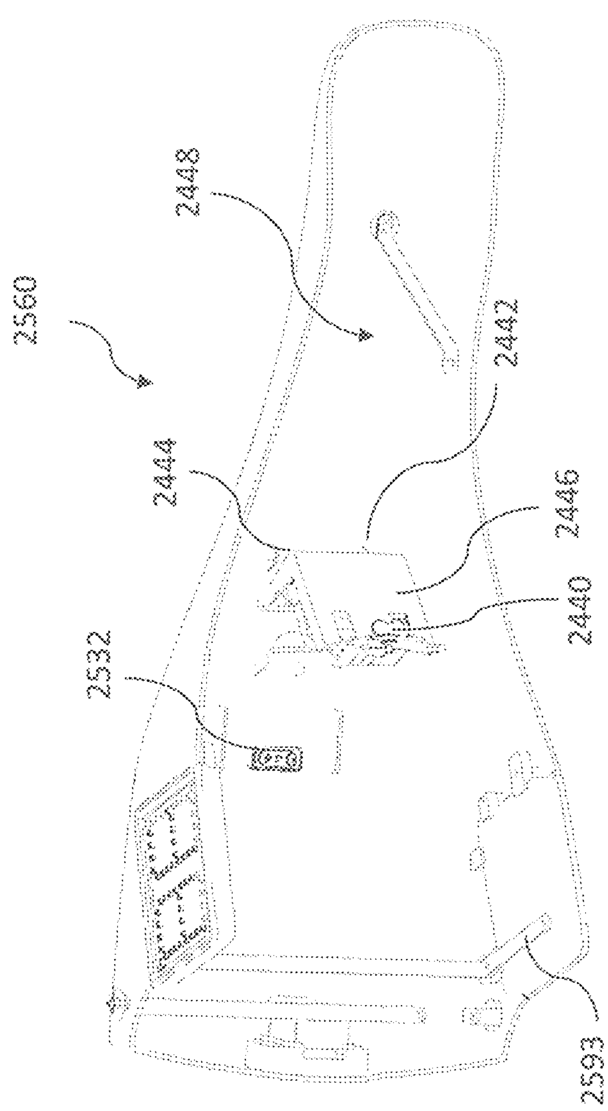

FIG. 27 shows that the quarter turn fastener 2440 has been unscrewed from a corresponding interface 2532, which has enabled the bracket 2446 to rotate about the hinges 2444 and 2442. This has caused the bracket 2446 to drop downwardly with respect to the underside of the fairing 2448. This enables the camera to be easily attached to or detached from the bracket 2446.

Figure 28:
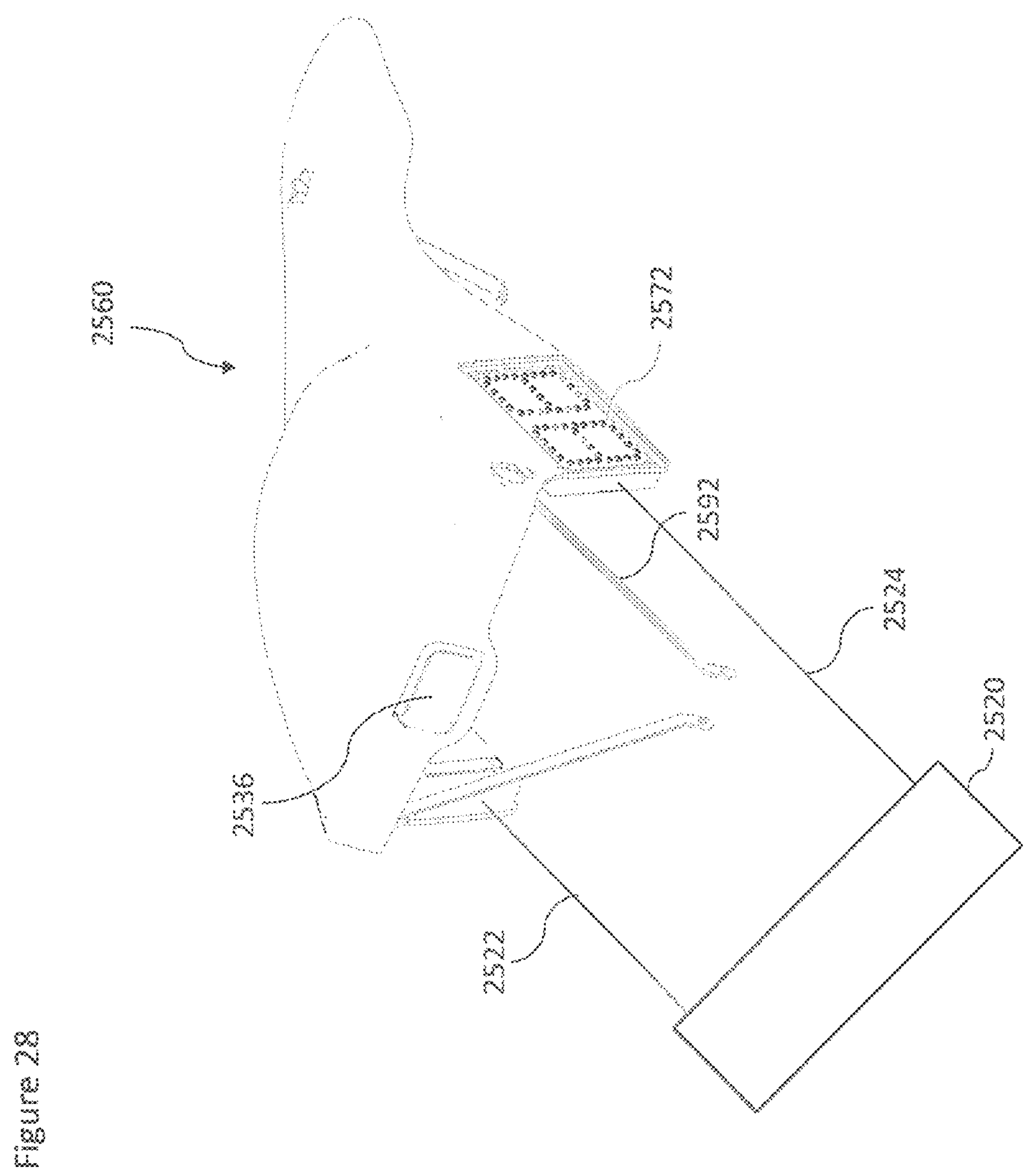

FIG. 28 shows a reverse view of the fairing 2560. The remote control 2536 for the camera is clearly shown in this Figure. When the fairing 2560 is attached to a go-kart, the remote control 2536 is positioned to be easily reached by a driver sitting in a cockpit of the go-kart.

Also shown schematically in FIG. 28 are electrical cables 2524 and 2522 connected to a power source, such as a battery pack 2520. The cable 2524 enables the LED panel 2572 to be powered by battery pack 2520. The cable 2522 enables the opposing LED panel to be powered by batter pack 2520. The battery pack may also power the camera and/or remote control. The battery pack could be mounted to the rear mounting bracket 2592 or on the chassis of the kart itself. In some embodiments the battery pack is rechargeable. The rechargeable battery pack is in some embodiments removable, and/or could be charged on the kart.

Figure 29:
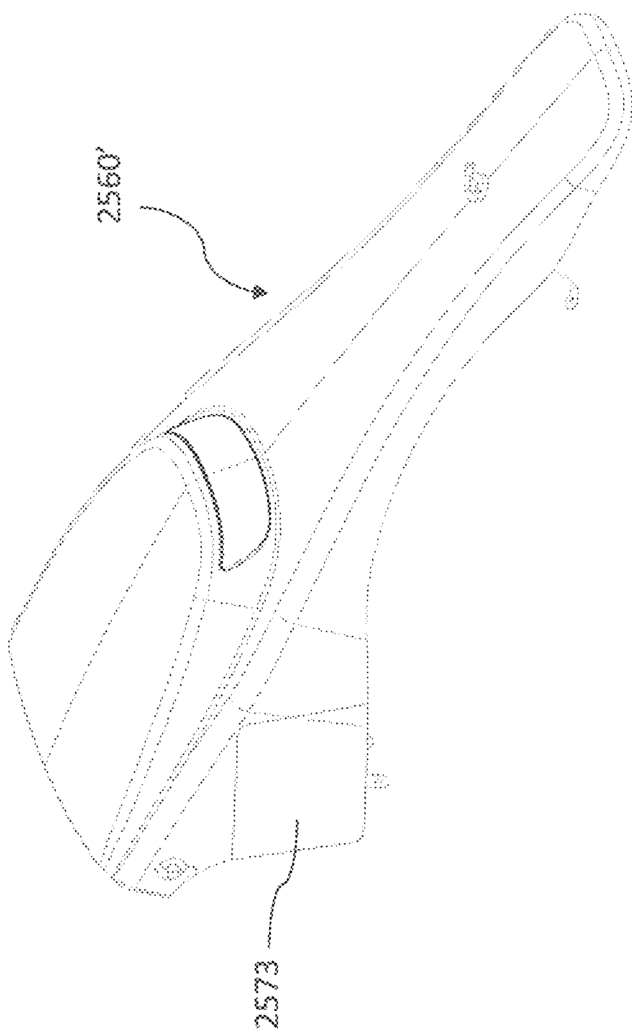

FIG. 29 shows a further embodiment of a go-kart fairing 2560'. This embodiment is the same as that shown with respect to FIGS. 25 to 28, except in the embodiment of FIG. 29 the LED panel 2572 is replaced with a blanking plate 2573. It will be appreciated that the blanking plate 2573 may be interchangeable with the information display module 2572 on the same fairing.

Figure 30:
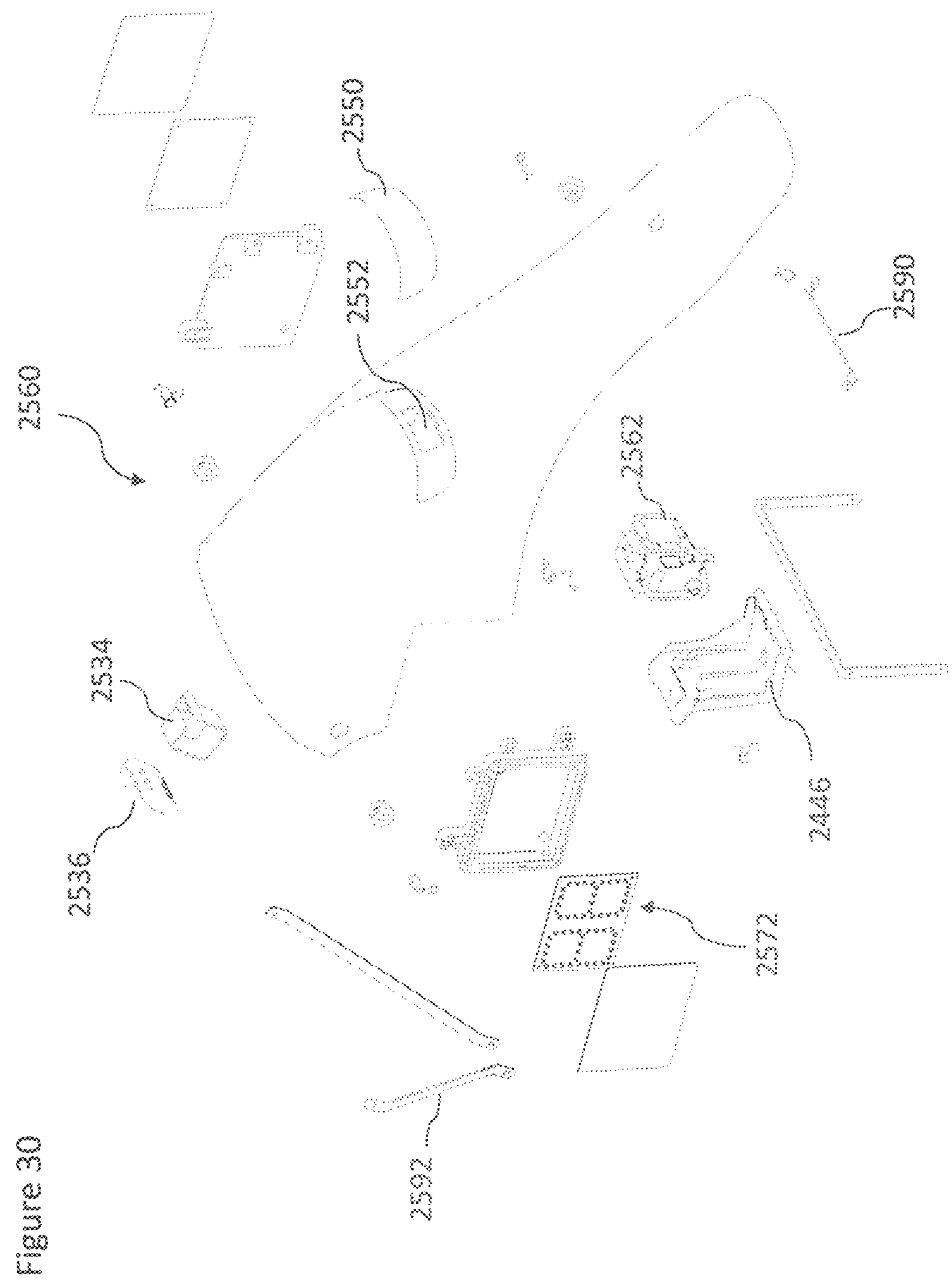

FIG. 30 shows an exploded view of the fairing assembly 2560. Shown in this Figure are LED panel 2572, bracket 2446, camera 2562, remote control 2536, remote control mounting bracket 2534, aperture 2552, screen 2550, front mounting portion 2590 and rear mounting portion 2592. It will be appreciated from this Figure that the aperture 2552 is smaller than the screen 2550. The aperture 2552 is located so as to be proximate to a lens of the camera 2562 when the camera is mounted in bracket 2446 and the bracket is in its operative position.

The LED display 2572 can display race information in the same manner as the information display modules previously described. Additionally or alternatively the display module 2572 can display other relevant information. For example the information may comprise information regarding a next race. For example on race day a central computer at the race venue may transmit a signal to each car 30 minutes prior to the race start, or indeed any other period of time before the race start. The countdown may then be displayed using the LED numbers on the side of the cars to show a driver and mechanic(s) how long before the car needs to be on the grid. Further information such as driver grid position could be sent to the cars and displayed by pressing a "function" switch on the rear of the LED panel. These further functions may also be employed in the information display modules described elsewhere in this application.

Figure 31:
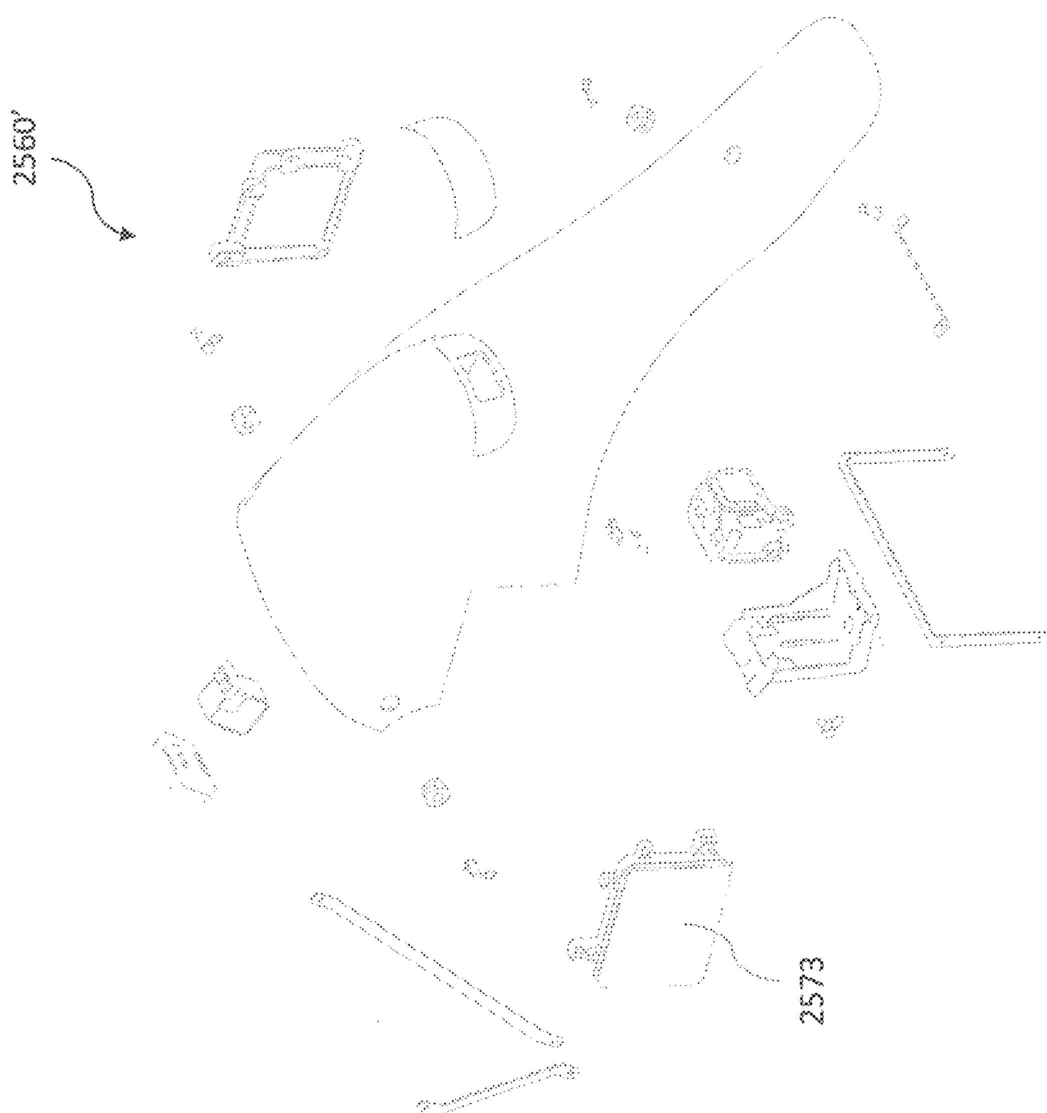

FIG. 31 is an exploded view of the fairing assembly 2560'. It can be seen from this Figure that the LED display module 2572 has been replaced by blanking plate 2573.

It will be understood that features of the various go-kart fairing embodiments can be combined in any appropriate manner.

Figure 20:
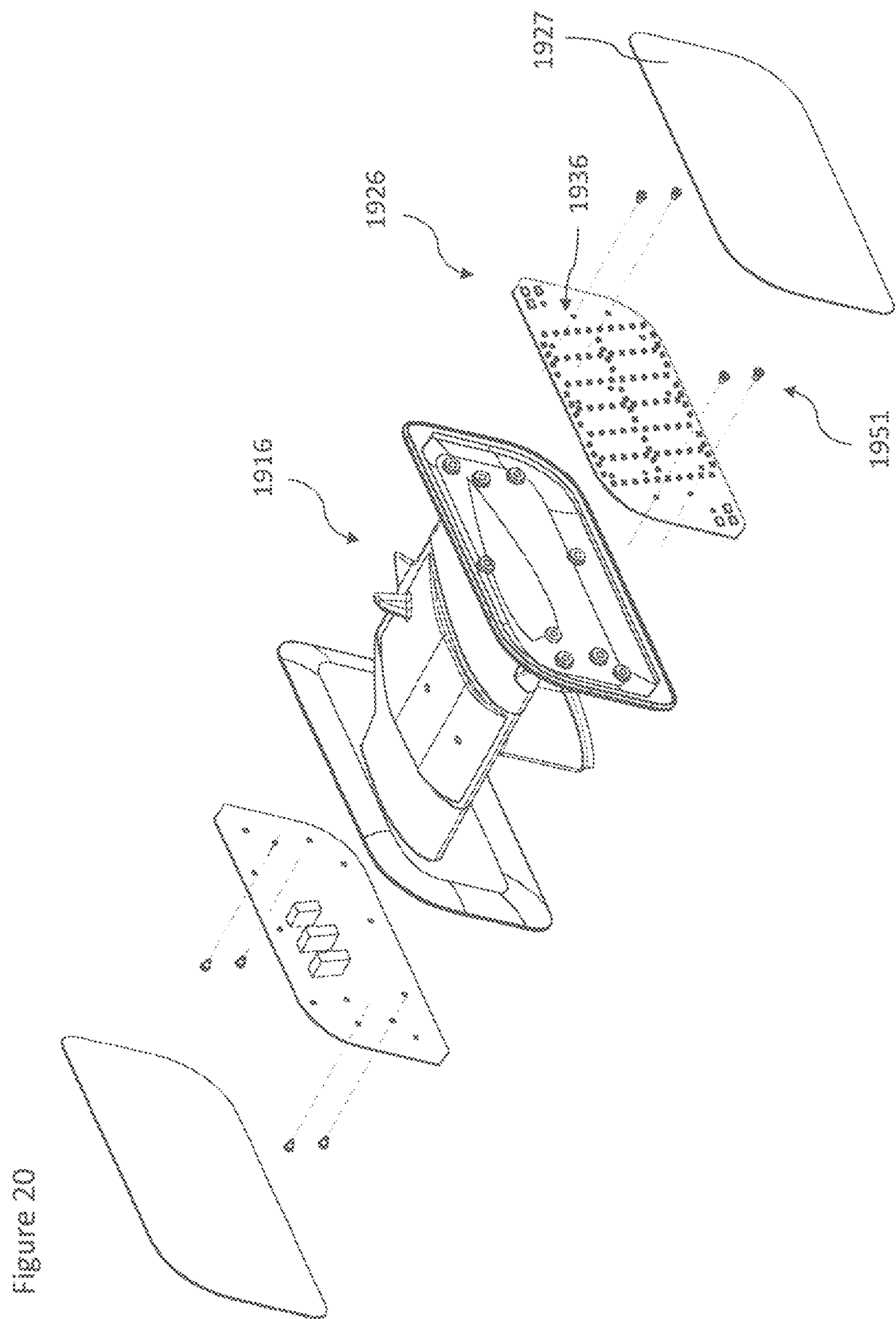

Some further embodiments of an information display module are shown in FIGS. 19 to 21. Features from these embodiments can be combined with any of the preceding embodiments described. Also, the hardware and software elements described with respect to FIG. 9 can be incorporated in any of the embodiments of FIGS. 19 to 21.

FIG. 19 shows an information display module 1926. The information display module 1926 comprises an array of LEDs 1936. The array of LEDs 1936 generally comprise a first set of LEDs 1937, a second set of LEDs 1939, and a third set of LEDs 1941. These three sets may be arranged in an overlapping manner e.g. such that a side of one set also comprises a side of the adjacent set, such that there is a common boundary. The display module may be considered to comprise an overlapping set of three seven-segment LED display regions. The display module 1926 also comprises a second information display area 1946, and a third information display area 1947.

FIG. 20 shows an exploded view of the information display module 1926 of FIG. 19, and how it may be attached to a camera module 1916. The LED panel 1936 may attach to an end plate with a screw arrangement 1951. The module 1926 further comprises an antiglare screen 1927.

Figures 21A, 21B, 21C, 21D, 21E, 21F:
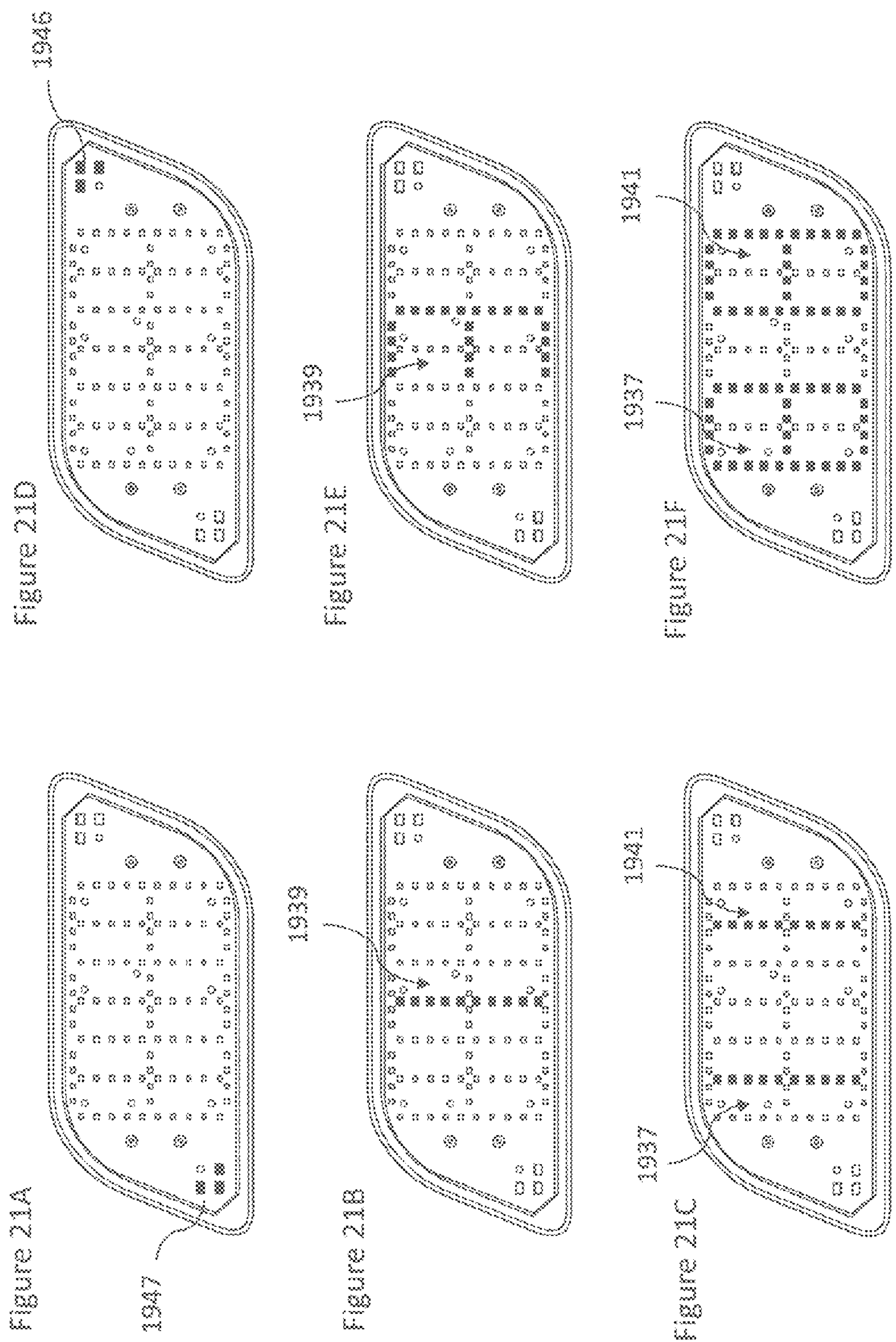
FIGS. 21A, 21B, 21C, 21D, 21E and 21F show various ways of illuminating an information display module according to an embodiment.

FIGS. 21A to 21F show how the LED display can be illuminated in different ways. FIGS. 21A and 21D show the illumination of regions 1947 and 1946 respectively. The regions 1946 and/or 1947 could be selectively illuminated to provide information associated with, for example, fastest lap or fastest sector, indication of flag conditions (yellow, red etc), tyre strategy (e.g. yellow for dry weather tyres, red for wet weather tyres etc.).

FIGS. 21B and 21E respectively show the illumination of LEDs to display a "1" and a "3". It will therefore be appreciated that in some embodiments for the illumination of a single digit the centre set of LEDs 1939 may be used.

FIGS. 21C and 21F respectively shown the illumination of LEDs to represent the numbers "11" and "88". Therefore it will be appreciated that in some embodiments where a double digit number is to be displayed then the first and third sets 1937 and 1941 of LEDs can be illuminated.

In some embodiments, where a three digit number is to be displayed, then each of sets 1937, 1939 and 1941 can be illuminated.

Figure 22:
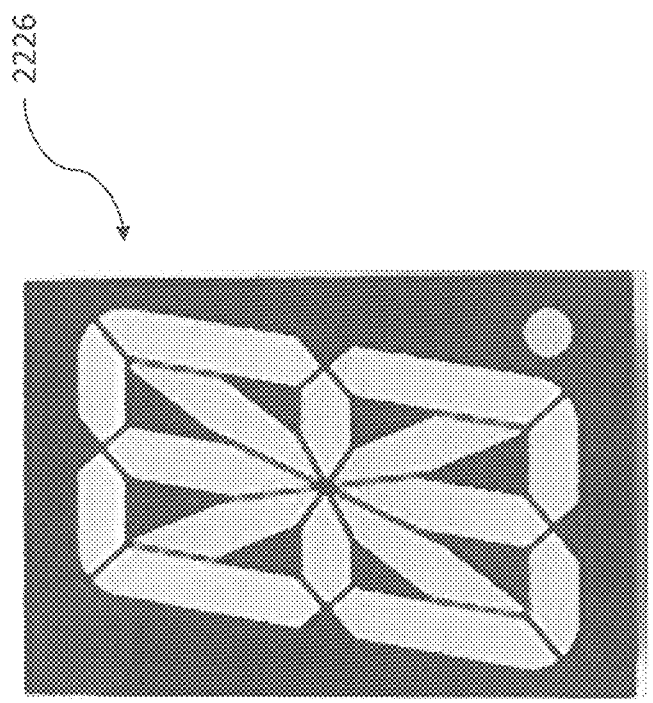
FIG. 22 shows a multi-segment display.

FIG. 22 shows a 16-segment display (SISD) 2226. In other embodiments displays comprising a different number of segments can be used. For example a 14-segment display could be used, which has unbroken top and bottom segments. This type of display enables further information, such as text information to be displayed. For example, such a display 2226 could indicate a driver name, such as "HAM" to represent Lewis Hamilton, or "VET" to represent Sebastian Vettel, by selectively illuminating the segments.

An embodiment may comprise a combination of the disclosed display modules. For example an LED array, such as that shown in FIG. 3 for example, could be used to represent position number, and a segmented display such as that shown in FIG. 22 could be used to provide text information. Together, such a display could provide driver position and name. For example the display could show "1 HAM" to show that Lewis Hamilton is in first place. The display of driver name may be particularly useful to distinguish between drivers who are on the same team and therefore driving cars that look similar or identical. This may also be helpful in races where there are driver changes, such as the Le Mans 24 hour race, enabling spectators to see which driver is driving at any given time. It will also be understood that an array of LEDs could be used to display text information.

Figure 23A:
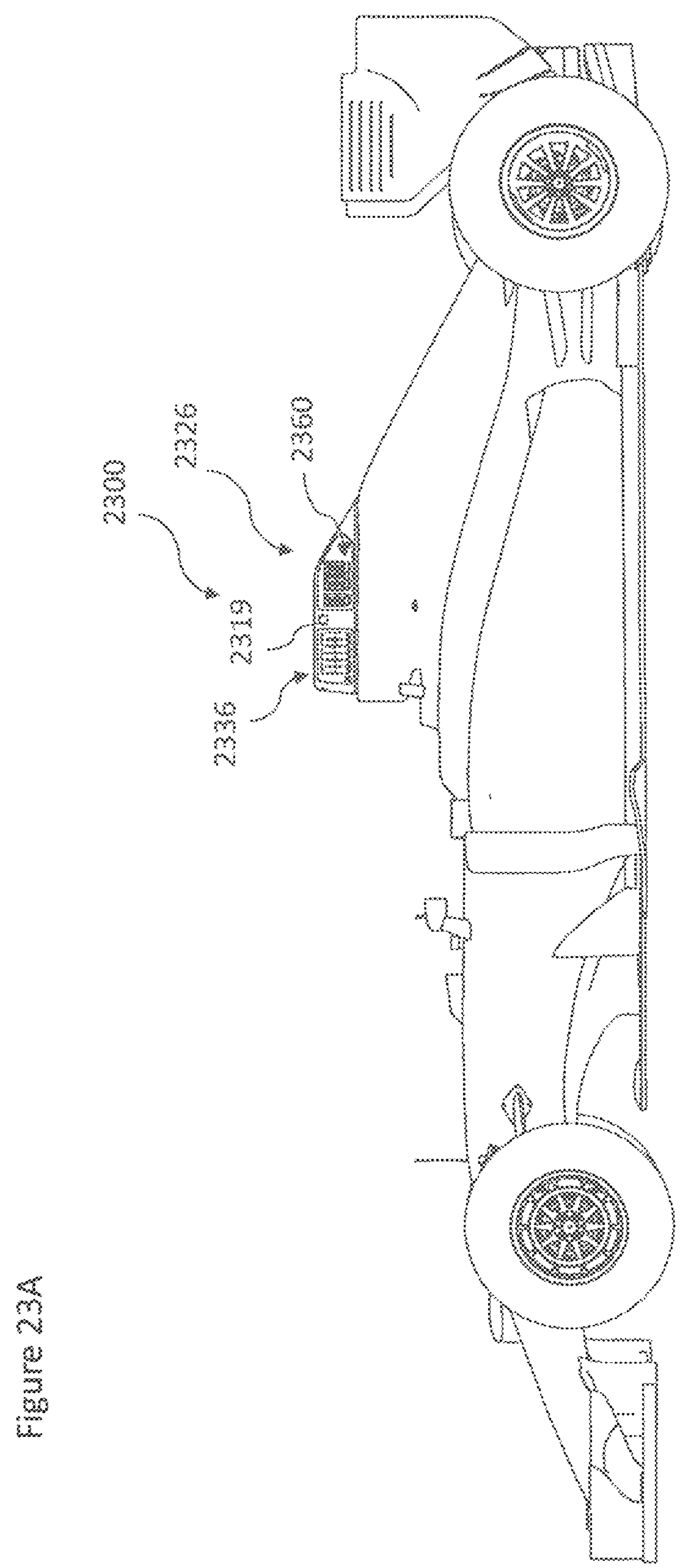
FIGS. 23A, 23B and 23C show a camera and information display according to a further embodiment.

In this respect, FIG. 23A shows a Formula 1 car 2300. An information display module is shown at 2326. The information display module comprises a first portion comprising an LED array 2336 for displaying race position information, and a second portion 2360 comprising a 16 segment display which can show driver name (or other relevant information).

Figure 23B:
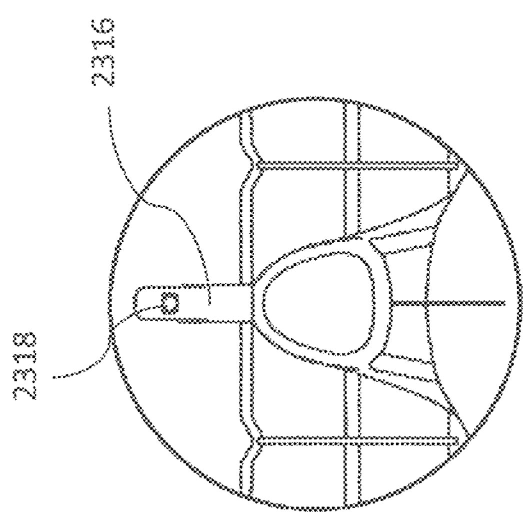

FIG. 23B shows a head-on view of the camera unit of the vehicle 2300. This camera unit differs from the camera unit 316 of FIG. 3, in that it is not T-shaped but rather forms an elongate upstanding portion. The displays 2336 and 2360 are not visible in FIG. 23B since they are recessed within the camera module 2316 (or the display surfaces are flush with the camera module housing). The camera module comprises a first camera lens 2318, and a second camera lens 2319 (see FIG. 23A).

Figure 23C:
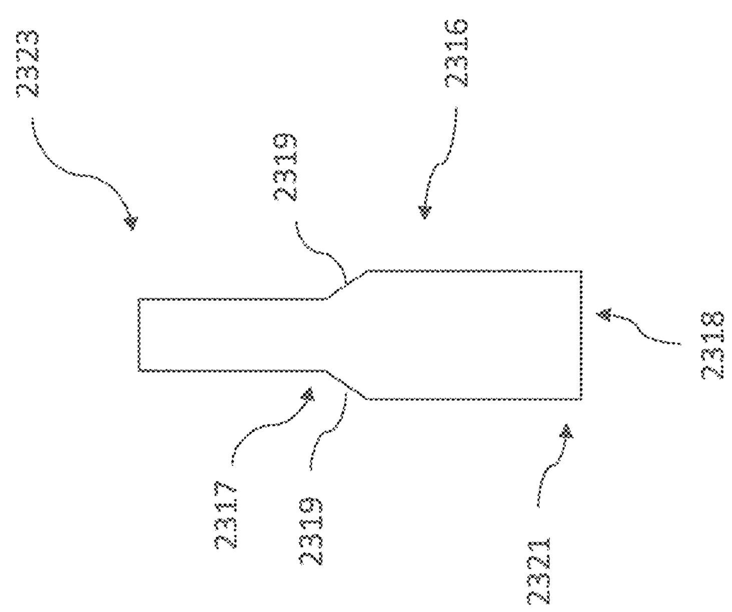

FIG. 23C is a plan view of the camera unit 2316. It can be appreciated from this Figure that the camera unit tapers down at region 2317 from a relatively enlarged portion 2321 to a relatively narrow portion 2323. The relatively enlarged portion 2321 may house electronic hardware required for the displays. As shown in FIG. 23C, the camera 2319 is located on the taper portion 2317. In embodiments there may be a camera unit 2319 on each side of the tapered portion. It will therefore be appreciated that the camera lens or lenses 2319 face sideways and rearwards with respect to the car 2300. This enables footage of cars approaching from the back of car 2300, and overtaking maneuvers, to be recorded and then displayed to spectators.

Figure 24:
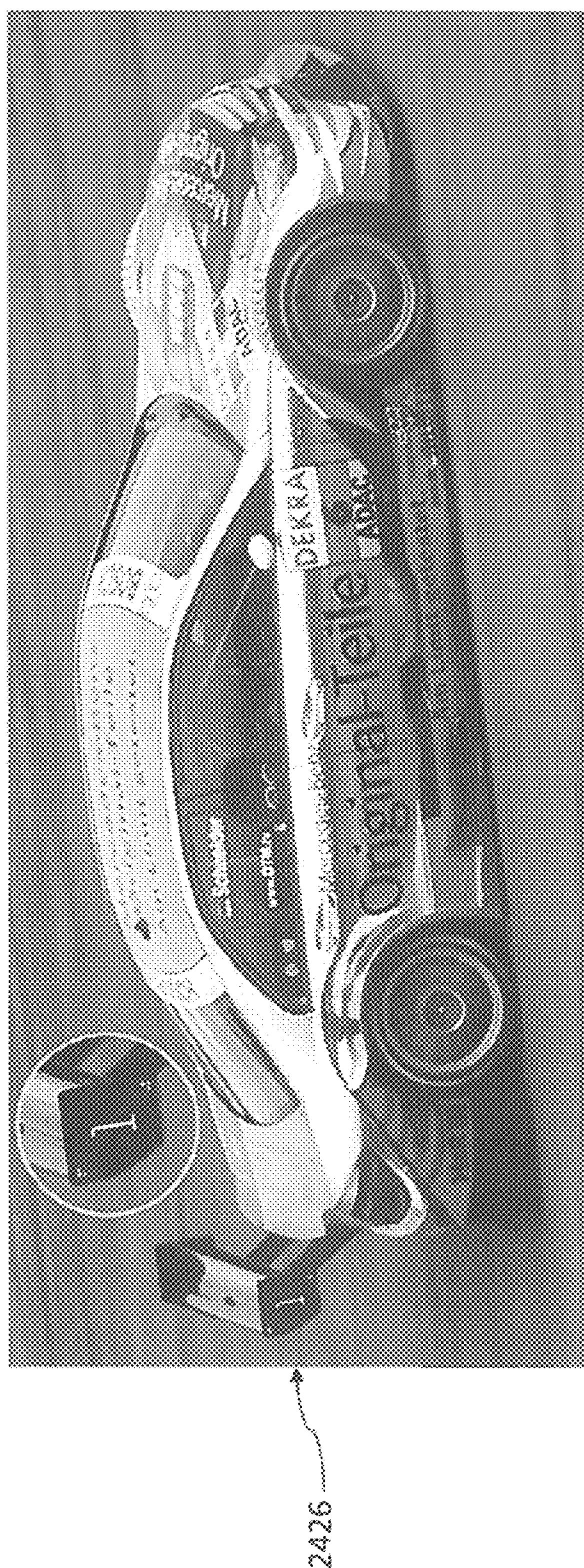
FIG. 24 shows an information display module attached to a DTM car, according to an embodiment.

It will be appreciated that the information display modules described in the application can be located at any position on a vehicle. For example, as shown in FIG. 24 the display module 2426 could be located on the side of a rear wing of a car, such as a DTM (Deutsche Tourenwagen Masters) racing car. The information display module may comprise an OLED (organic light emitting diode) display. OLED displays are thin and flexible and enable the display to be positioned at almost any location on a vehicle. OLED displays can also conform to various shapes, enabling the display to be attached to a number of surfaces, including non-flat surfaces. The display may also comprise an AMOLED (active-matrix organic light-emitting diode) display. The displays can also display information in addition to race position and driver name etc. The displays could also, for example, display branding such as sponsors' logos. The displayed branding could be updated during a race.

The displays can be of any size and cover any amount of a vehicle's surface.

The modular and/or detachable nature of the race information display means that it can be easily attached/detached to and from vehicles. Therefore if the display is damaged, for example during a crash, it can be easily replaced. It also allows the display to be positioned on the vehicle at a location of a designer's choosing. The same information display unit or module can also be used or re-used on different vehicles. Standardised attachment means on the display modules and vehicles may also be provided to enhance interchangeability. The attachment means may also be configured to enable the information display modules to quickly and easily attach to a vehicle's power supply and/or computing units (e.g. to obtain telemetry and/or race data). Therefore, in some embodiments the information display modules could be considered plug-and-play units.

In some embodiments the information display module has the capability to receive information, such as the lap or split-times of various vehicles, and to determine from that received information what race-related information to display. For example in some embodiments the information display module may receive timing information of some or all vehicles in a race, determine the position of the vehicle on which the module is mounted, and then display that information. In other embodiments, the information display module may be told what information to display, in which case the information display module may determine simply to display that information. For example information could be sent to the vehicle or module to inform it of its position, which position number can then be displayed on the display. For example the module may receive information that its associated vehicle is in third place, in which case it will determine to display a "3".

An appropriately adapted computer program code product or products may be used for implementing the embodiments, when loaded on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the described technology may thus be practiced in various components such as integrated circuit modules.

It is also noted herein that while the above describes exemplifying embodiments of the inventive technology, there are several variations and modifications which may be made to the disclosed solution without departing from the scope of the present invention. Features of the various embodiments can also be combined.

What is claimed is:

1. A race information display unit for a motor-racing vehicle, said race information display unit comprising:

a T-shaped mount attachable to said motor-racing vehicle, said T-shaped mount comprising a cross-member attached to a stanchion; and two information display modules, a first of said two information display modules being attached to a first end of said cross-member, and a second of said two information display modules being attached to a second end of said cross-member, said second end of said cross-member being opposite said first end of said cross-member, each information display module having a plate-like structure and comprising a display configured to display race-related information to spectators of a race, a face of each display being oriented in a plane substantially parallel to a longitudinal axis of said stanchion, each information display module being configured to use received information to determine the race-related information to be displayed, said race-related information comprising: a relative position of said motor-racing vehicle to one or more other vehicles in said race; and one or more of: race flag information; tire information; penalty information; pit-stop information; or driver name information.

2. The race information display unit as set forth in claim 1, wherein said received information comprises the relative position of said motor-racing vehicle.

3. The race information display unit as set forth in claim 1, wherein each information display module is configured to use the received information to determine the relative position of said motor-racing vehicle.

4. The race information display unit as set forth in claim 1, wherein said race information display unit is directly attachable to said motor-racing vehicle.

5. The race information display unit as set forth in claim 1, wherein said race information display unit comprises a camera.

6. The race information display unit as set forth in claim 1, wherein each display comprises an LED array, and wherein a brightness of each LED array can be varied.

7. The race information display unit as set forth in claim 1, wherein each information display module is configured to receive said received information from an external source, and wherein said external source comprises one or more transmitters at a race venue.

8. The race information display unit as set forth in claim 1, further comprising a processor for processing said received information, and a memory for storing said received information.

9. The race information display unit as set forth in claim 1, wherein each information display module is configured to be removably attachable to said motor-racing vehicle.

10. The race information display unit as set forth in claim 1, wherein a shape of each information display module is one of: a parallelogram; a trapezium; a square; a rectangle; or an oval.

11. The race information display unit as set forth in claim 1, wherein each information display module is configured to connect to one or more of: a memory; a processor, a transmitter; a receiver associated with said motor-racing vehicle.

12. A motor-racing vehicle comprising a race information display unit, said race information display unit comprising:

a T-shaped mount attachable to the motor-racing vehicle, said T-shaped mount comprising a cross-member attached to a stanchion; and two information display modules, a first of said two information display modules being attached to a first end of said cross-member, and a second of said two information display modules being attached to a second end of said cross-member, said second end of said cross-member being opposite said first end of said cross-member, each information display module having a plate-like structure and comprising a display configured to display race-related information to spectators of a race, a face of each display being oriented in a plane substantially parallel to a longitudinal axis of said stanchion, each information display module being configured to use received information to determine the race-related information to be displayed, said race-related information comprising a relative position of said motor-racing vehicle to one or more other vehicles in said race; and one or more of: race flag information; tire information; penalty information; pit-stop information; or driver name information.

13. The motor-racing vehicle as set forth in claim 12, wherein said motor-racing vehicle comprises a camera module, said camera module being attached to said race information display unit.

14. The motor-racing vehicle as set forth in claim 12, wherein said motor-racing vehicle comprises one of: a car; a go-kart; or a motorcycle.

* * * * *